(12) United States Patent
Kim et al.

(10) Patent No.: US 10,805,945 B2
(45) Date of Patent: Oct. 13, 2020

(54) METHOD FOR TRANSMITTING PHYSICAL UPLINK CONTROL CHANNEL IN WIRELESS COMMUNICATION SYSTEM SUPPORTING UNLICENSED BAND AND DEVICE SUPPORTING SAME

(71) Applicant: LG ELECTRONICS INC., Seoul (KR)

(72) Inventors: Seonwook Kim, Seoul (KR); Joonkui Ahn, Seoul (KR); Suckchel Yang, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 16/086,580

(22) PCT Filed: Mar. 27, 2017

(86) PCT No.: PCT/KR2017/003253
§ 371 (c)(1),
(2) Date: Sep. 19, 2018

(87) PCT Pub. No.: WO2017/171325
PCT Pub. Date: Oct. 5, 2017

(65) Prior Publication Data
US 2019/0110307 A1    Apr. 11, 2019

Related U.S. Application Data

(60) Provisional application No. 62/313,798, filed on Mar. 27, 2016, provisional application No. 62/314,375, (Continued)

(51) Int. Cl.
*H04W 72/12* (2009.01)
*H04W 74/08* (2009.01)

(52) U.S. Cl.
CPC ... *H04W 72/1268* (2013.01); *H04W 74/0808* (2013.01)

(58) Field of Classification Search
CPC ............ H04W 72/1268; H04W 74/0808
See application file for complete search history.

(56) References Cited

U.S. PATENT DOCUMENTS

| 10,425,924 B2* | 9/2019 | Takeda ............... H04J 11/0023 |
| 2019/0014596 A1* | 1/2019 | Yang ................ H04W 72/0446 |
| 2019/0037598 A1* | 1/2019 | Hamidi-Sepehr ........................... H04W 72/0413 |

FOREIGN PATENT DOCUMENTS

| CN | 104994591 | 10/2015 |
| WO | 2015050718 | 4/2015 |

(Continued)

OTHER PUBLICATIONS

European Patent Office Application Serial No. 17775750.7, Search Report dated Jul. 8, 2019, 11 pages.

(Continued)

*Primary Examiner* — Habte Mered
(74) *Attorney, Agent, or Firm* — Lee, Hong, Degerman, Kang & Waimey

(57) ABSTRACT

Disclosed in the present invention are a method for a terminal transmitting a physical uplink control channel to a base station in a licensed assisted access (LAA) system in which the base station or the terminal performs a listen-before-talk (LBT)-based signal transmission, and a device supporting same.

16 Claims, 19 Drawing Sheets

Related U.S. Application Data filed on Mar. 28, 2016, provisional application No. 62/319,267, filed on Apr. 6, 2016.

(56) References Cited

FOREIGN PATENT DOCUMENTS

| WO | 2015050743 | 4/2015 |
|---|---|---|
| WO | 2015089282 | 6/2015 |

OTHER PUBLICATIONS

Huawei, et al., "UL transmission design for LAA", 3GPP TSG RAN WG1 Meeting #81, R1-153228, XP050970981, May 2015, 6 pages.
LG Electronics, "PUSCH transmission in LAA", 3GPP TSG RAN WG1 Meeting #84, R1-160625, XP051053954, Feb. 2016, 5 pages.
Samsung, "Discussion on PUCCH for UL LAA", 3GPP TSG RAN WG1 Meeting #84, R1-160563, XP051053895, Feb. 2016, 2 pages.
PCT International Application No. PCT/KR2017/003253, Written Opinion of the International Searching Authority dated Jun. 29, 2017, 15 pages.
Fujitsu, "UL LBT and PUSCH Design for LAA", 3GPP TSG RAN WG1 Meeting #84, R1-160489, Feb. 2016, 7 pages.
Intel, et al., "Way forward on UL LBT", 3GPP TSG RAN WG1 Meeting #84, R1-161379, Feb. 2016, 6 pages.

* cited by examiner (a)

(b)

METHOD FOR TRANSMITTING PHYSICAL UPLINK CONTROL CHANNEL IN WIRELESS COMMUNICATION SYSTEM SUPPORTING UNLICENSED BAND AND DEVICE SUPPORTING SAME

CROSS-REFERENCE TO RELATED APPLICATIONS

This application is the National Stage filing under 35 U.S.C. 371 of International Application No. PCT/KR2017/003253, filed on Mar. 27, 2017, which claims the benefit of U.S. Provisional Application No. 62/313,798, filed on Mar. 27, 2016, 62/314,375, filed on Mar. 28, 2016, and 62/319,267, filed on Apr. 6, 2016, the contents of which are all hereby incorporated by reference herein in their entirety.

TECHNICAL FIELD

Following description relates to a wireless communication system supporting an unlicensed band, and more particularly, to a method for a user equipment to transmit a physical uplink control channel in a wireless communication system supporting an unlicensed band and apparatuses supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Task

When a user equipment transmits a physical uplink control channel (PUCCH) to a base station via an unlicensed band, an object of the present invention is to newly define LBT (Listen-Before-Talk) performed by the user equipment based on the characteristic of the unlicensed band and provide a method for the user equipment to transmit PUCCH based on the LBT.

In particular, an object of the present invention is to provide a method for a user equipment to more reliably transmit PUCCH by distinguishing an LBT operation for transmitting the PUCCH from an LBT operation for transmitting a physical uplink shared channel (PUSCH).

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method for a user equipment to transmit a physical uplink control channel in a wireless communication system supporting an unlicensed band and apparatuses therefor.

To achieve these and other advantages and in accordance with the purpose of the present invention, as embodied and broadly described, according to one embodiment, a method of transmitting a physical uplink control channel (PUCCH), which is transmitted by a user equipment in a wireless communication system supporting an unlicensed band, includes performing first LBT (Listen-Before-Talk) for transmitting a PUCCH, and if the first LBT is successfully performed, transmitting the PUCCH. In this case, a probability of success of the first LBT is higher than a probability of success of a second LBT for transmitting a physical uplink shared channel (PUSCH).

To further achieve these and other advantages and in accordance with the purpose of the present invention, a user equipment transmitting a physical uplink control channel to a base station in a wireless communication system supporting an unlicensed band includes a transmitter and a processor configured to operate in a manner of being connected with the transmitter, the processor configured to perform first LBT (Listen-Before-Talk) for transmitting a PUCCH, the processor, if the first LBT is successfully performed, configured to transmit the PUCCH. In this case, a probability of success of the first LBT is higher than a probability of success of a second LBT for transmitting a physical uplink shared channel (PUSCH).

For example, when the user equipment performs the first LBT and the second LBT to transmit the PUCCH and a separate PUSCH at the same time in a specific subframe, the method can further include, if the second LBT is successfully performed, transmitting the PUCCH and the PUSCH at the same time in the specific subframe, and if the first LBT is successfully performed only, transmitting the PUCCH only in the specific subframe.

As a different example, if transmission of the PUCCH is scheduled in an $N^{th}$ (N is a natural number) subframe and transmission of the PUSCH is scheduled in an $(N+1)^{th}$ subframe, the method can further include performing the second LBT for transmitting the PUSCH irrespective of the first LBT.

As a further different example, when transmission of the PUCCH is scheduled in an $N^{th}$ (N is a natural number) subframe and transmission of the PUSCH is scheduled in an $(N+1)^{th}$ subframe, if the first LBT is successfully performed, the method can further include transmitting the PUSCH in the $(N+1)^{th}$ subframe.

As a further different example, when transmission of the PUCCH is scheduled in an $N^{th}$ (N is a natural number) subframe, transmission of the PUSCH is scheduled in an $(N+1)^{th}$ subframe, and information on third LBT is received from a base station, the method can further include additionally performing the third LBT to transmit the PUCCH, and if the third LBT is successfully performed, transmitting the PUSCH in the $(N+1)^{th}$ subframe, and if the third LBT fails, determining whether to transmit the PUSCH by performing the second LBT for transmitting the PUSCH. In this case, the third LBT may correspond to random backoff-based LBT.

As a further different example, if uplink transmission is scheduled in a time band at which the PUCCH is to be transmitted on a second unlicensed band rather than a first unlicensed band on which the PUCCH is to be transmitted, the method can further include dropping the uplink transmission on the second unlicensed band.

In this case, the first LBT may correspond LBT satisfying at least one selected from the group consisting of LBT performing channel sensing during a time period shorter than a time period of the second LBT, LBT to which a contention window (CW) size value smaller than a CW size value of the second LBT is set, and LBT to which an energy detection threshold value greater than an energy detection threshold value of the second LBT is set.

And, a resource region in which the PUCCH is transmitted may correspond to the whole of an interlace or a part of the interlace configured by frequency resources of which a plurality of frequency bands having a prescribed frequency size are separated from each other with a prescribed interval.

And, a PUCCH resource index at which the PUCCH is transmitted can be determined by a combination of higher layer signaling and downlink control information.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

As is apparent from the above description, the embodiments of the present disclosure have the following effects.

According to the present invention, a user equipment is able to more reliably transmit PUCCH via an unlicensed band in a wireless access system supporting unlicensed bands.

Effects obtainable from the present invention are non-limited by the above mentioned effect. And, other unmentioned effects can be clearly understood from the following description by those having ordinary skill in the technical field to which the present invention pertains. That is, effects which are not intended by the present invention may be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE

Mode for Invention

Figure 1:
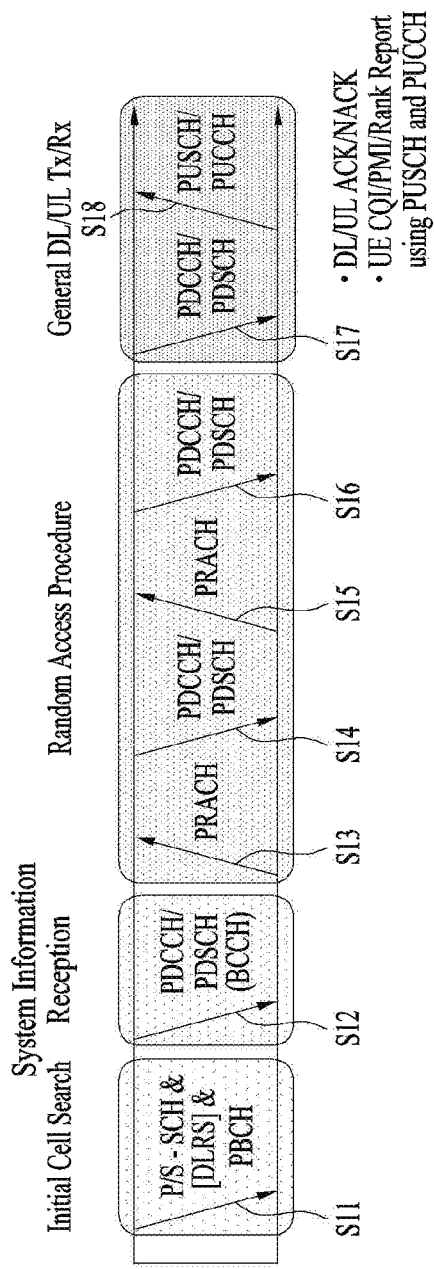
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), and CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SCFDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
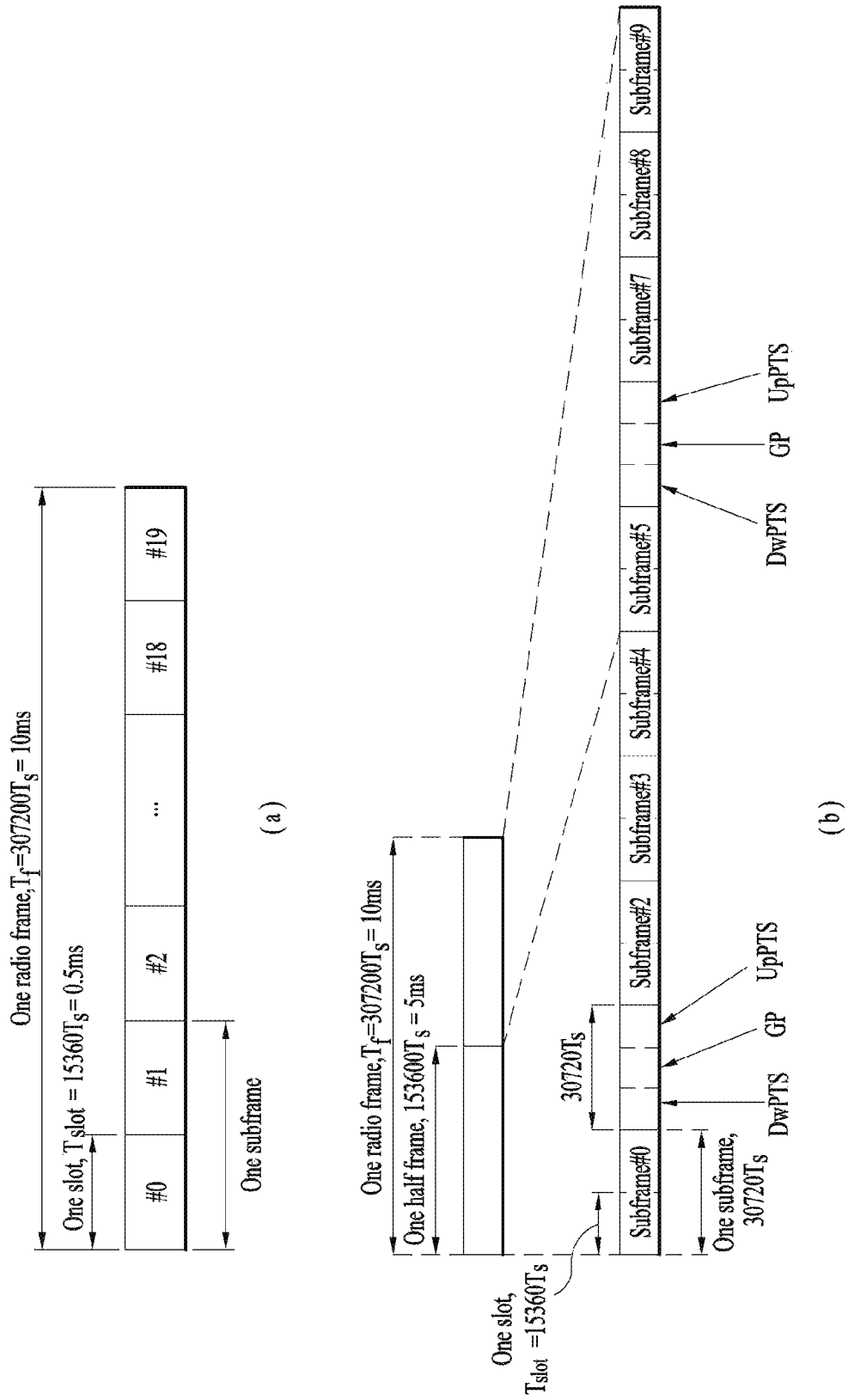
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SCFDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

Figure 3:
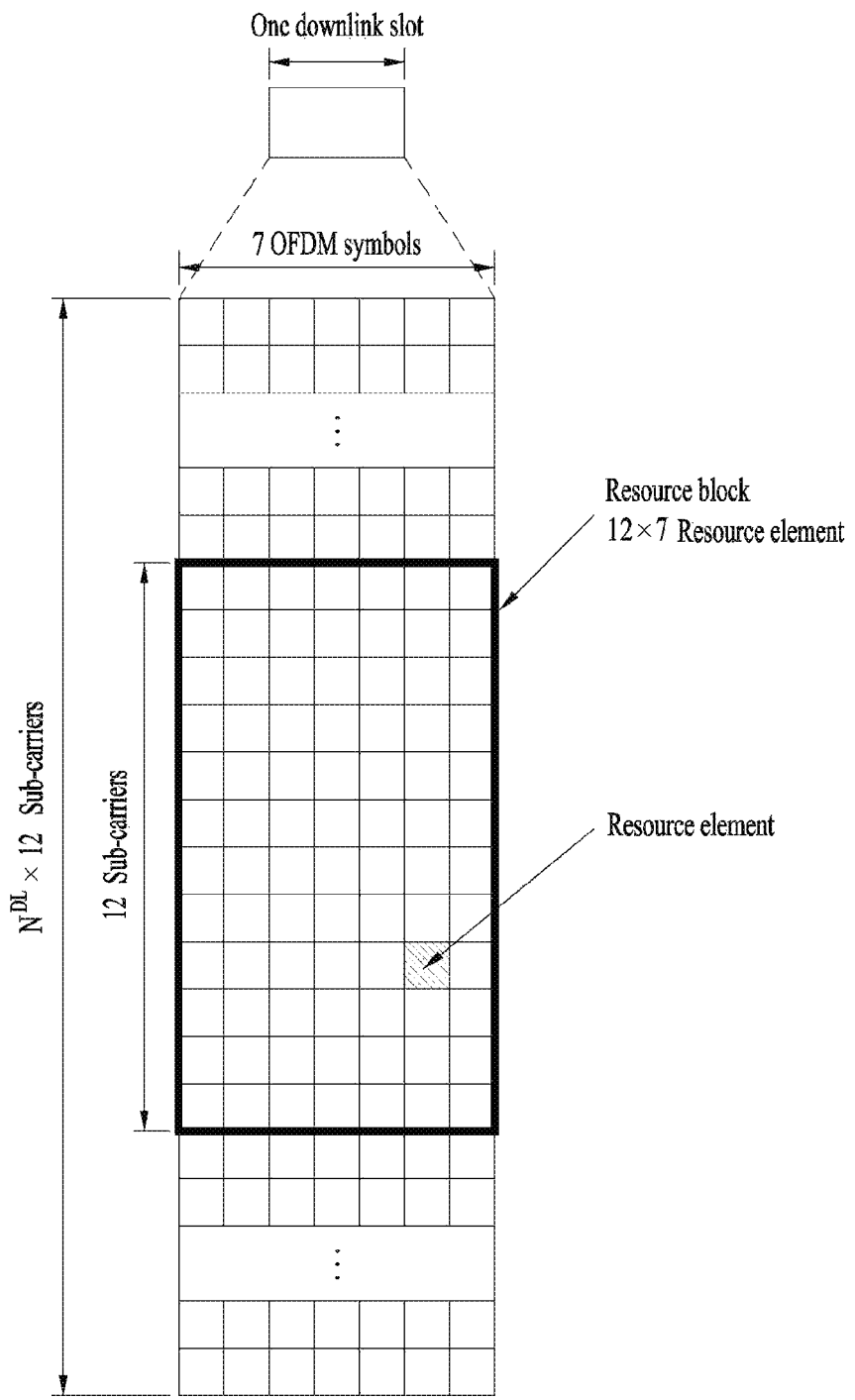
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A structure of an uplink slot may be identical to a structure of a downlink slot.

Figure 4:
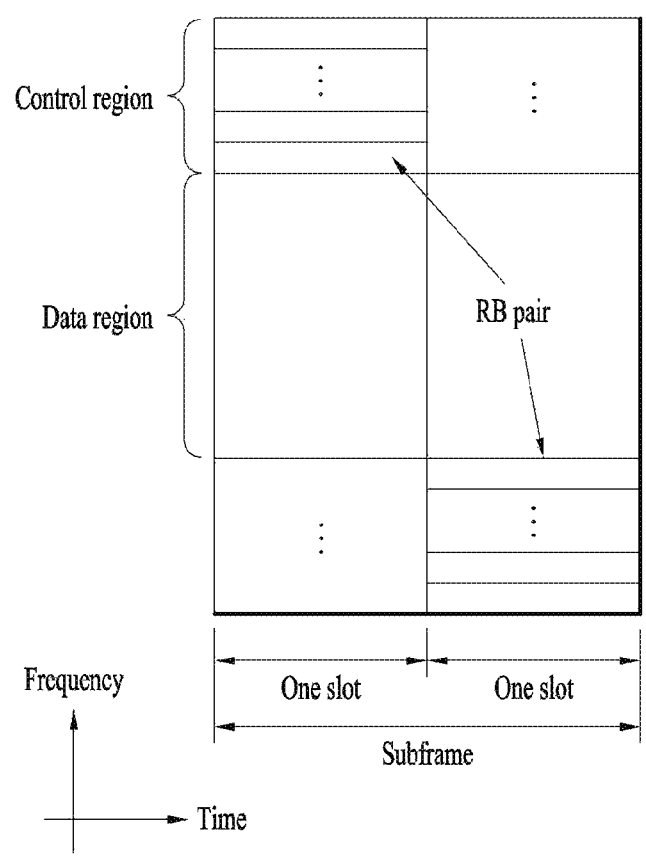
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

Figure 5:
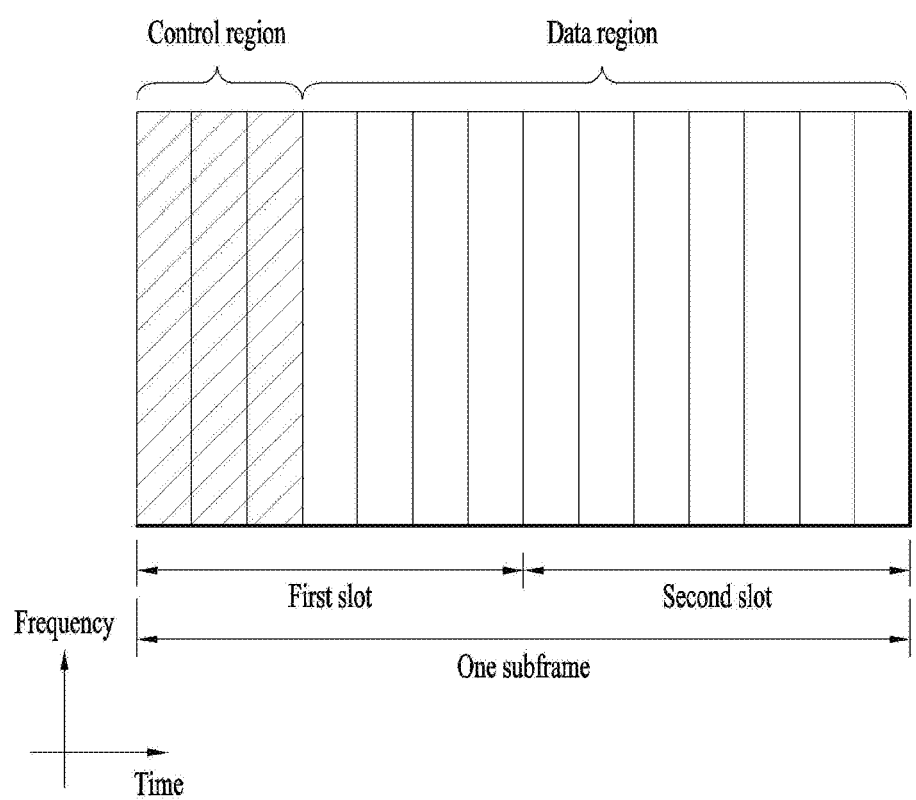
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. LTE-U System
2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
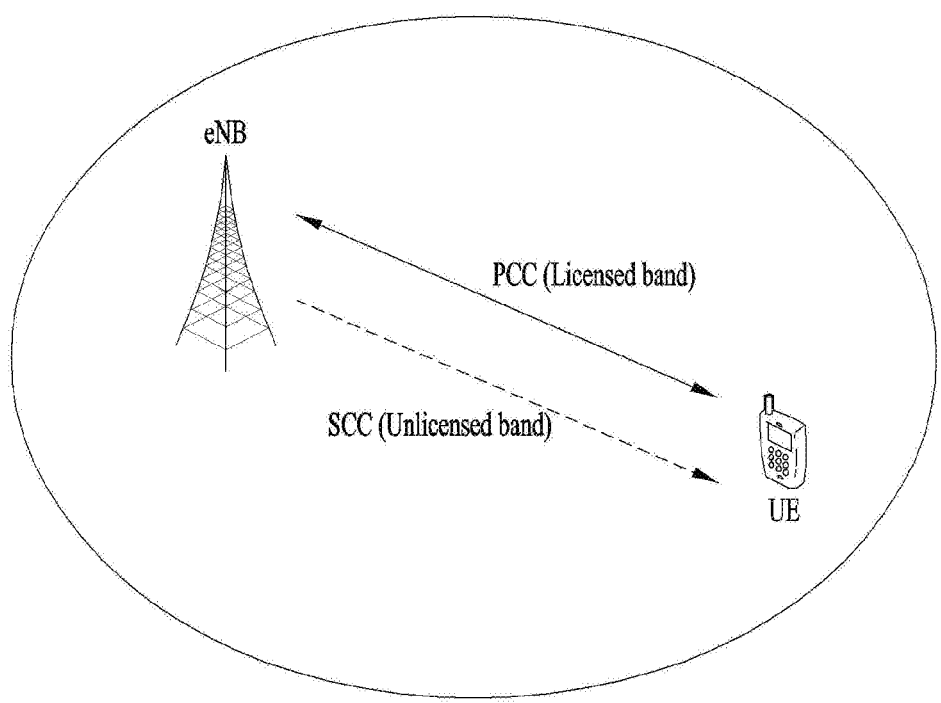
FIG. 6 is a diagram illustrating an exemplary CA environment supported in an LTE-Unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
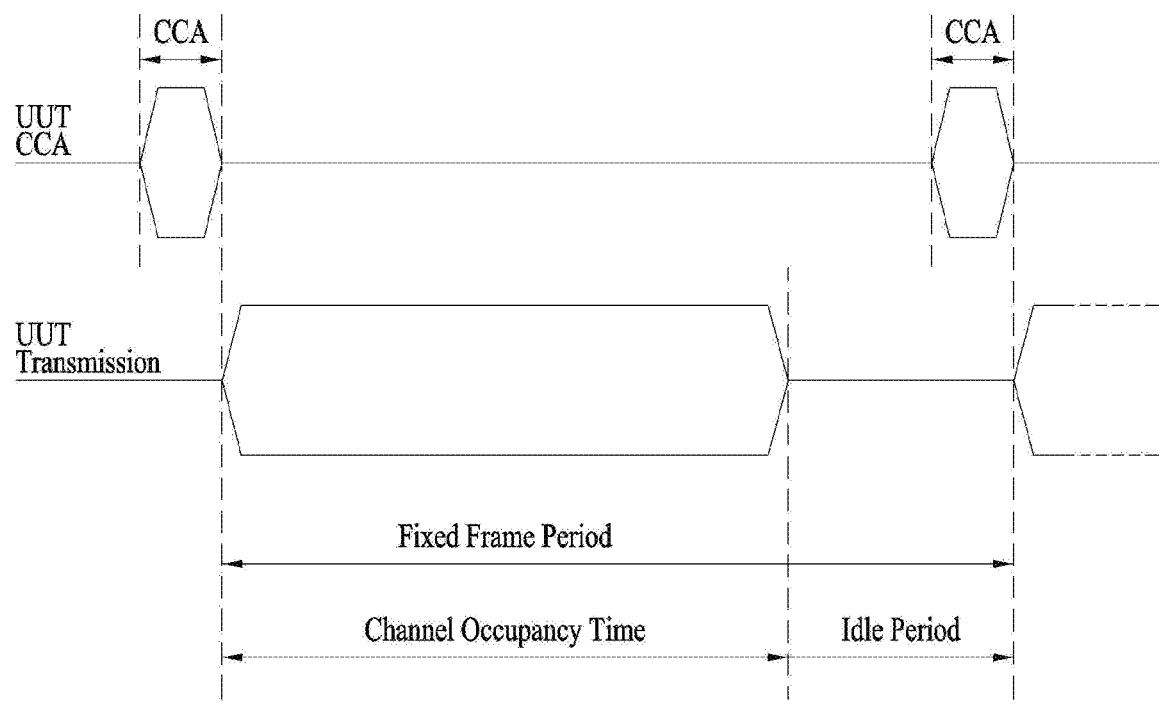
FIG. 7 is a diagram illustrating an exemplary Frame Based Equipment (FBE) operation as one of Listen-Before-Talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
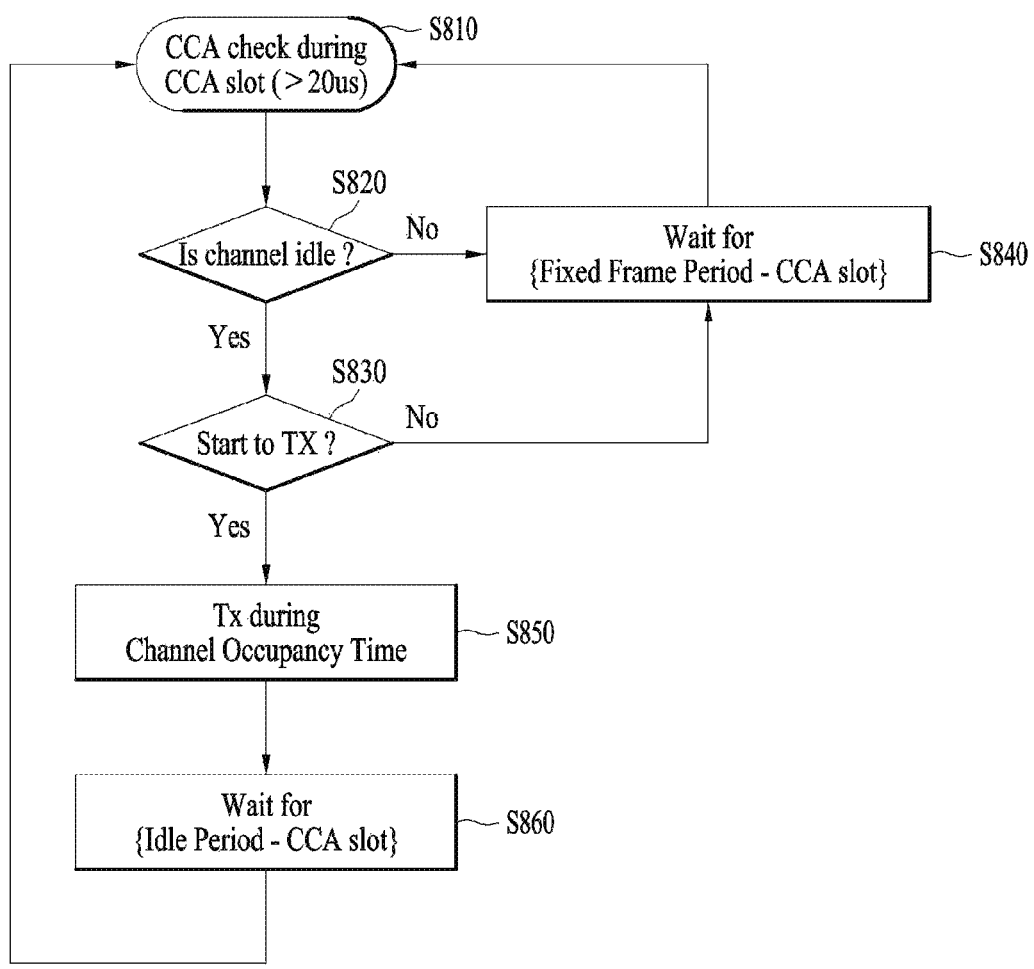
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot [S810]. If the channel is idle [S820], the communication node performs data transmission (Tx) [S830]. If the channel is busy, the communication node waits for a time period calculated by subtracting the CCA slot from a fixed frame period, and then resumes CCA [S840].

The communication node transmits data during the channel occupancy time [S850]. Upon completion of the data transmission, the communication node waits for a time period calculated by subtracting the CCA slot from the idle period [S860], and then resumes CCA [S810]. If the channel is idle but the communication node has no transmission data, the communication node waits for the time period calculated by subtracting the CCA slot from the fixed frame period [S840], and then resumes CCA [S810].

Figure 9:
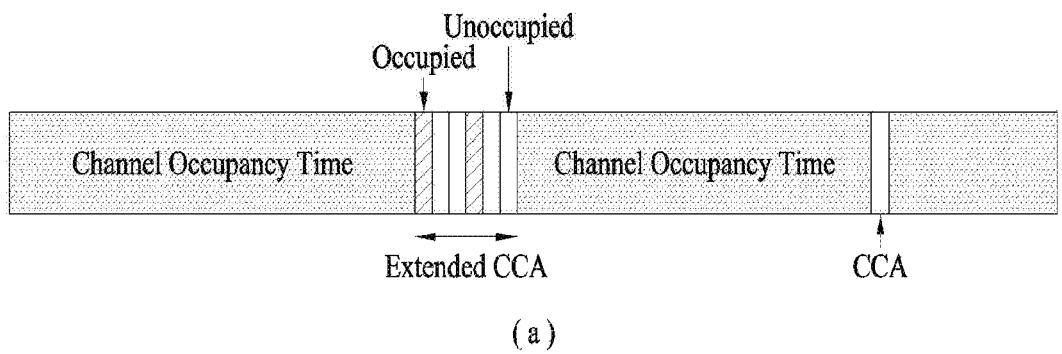
FIG. 9 is a diagram illustrating an exemplary Load Based Equipment (LBE) operation as one of the LBT operations.
Figure 9:
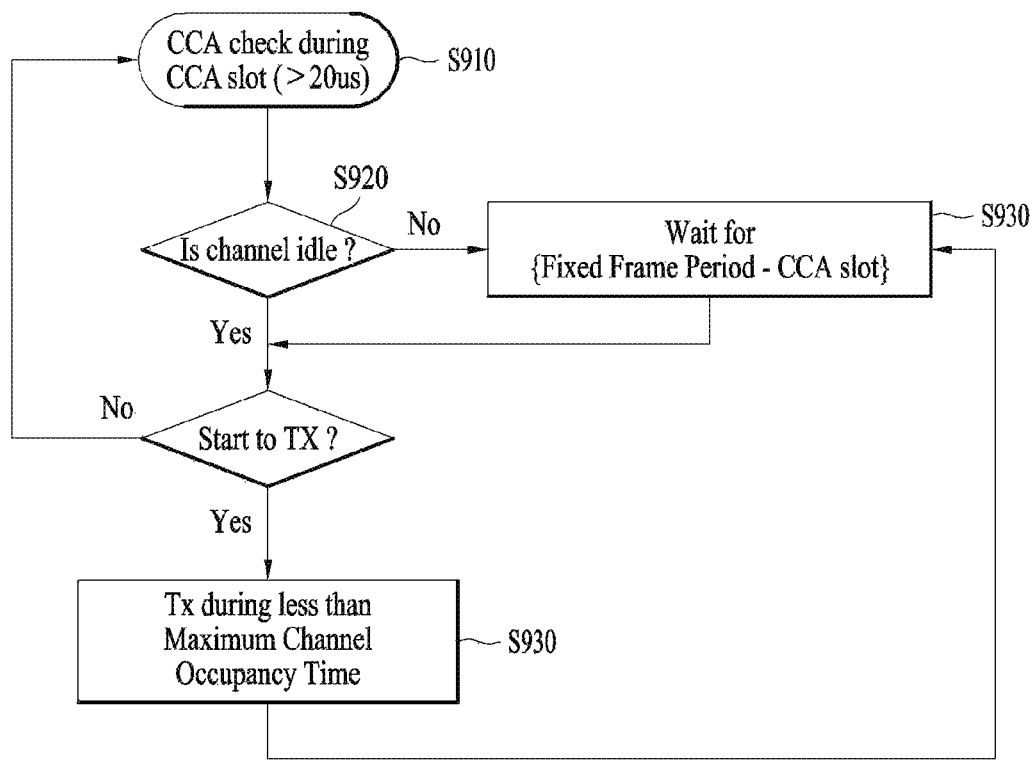

FIG. 9 is a view illustrating an exemplary LBE operation as one of the LBT operations.

Referring to FIG. 9(*a*), in LBE, the communication node first sets q (q∈{4, 5, . . . , 32}) and then performs CCA during one CCA slot.

FIG. 9(*b*) is a block diagram illustrating the LBE operation. The LBE operation will be described with reference to FIG. 9(*b*).

The communication node may perform CCA during a CCA slot [S910]. If the channel is unoccupied in a first CCA slot [S920], the communication node may transmit data by securing a time period of up to (13/32)q ms [S930].

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms [S940].

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
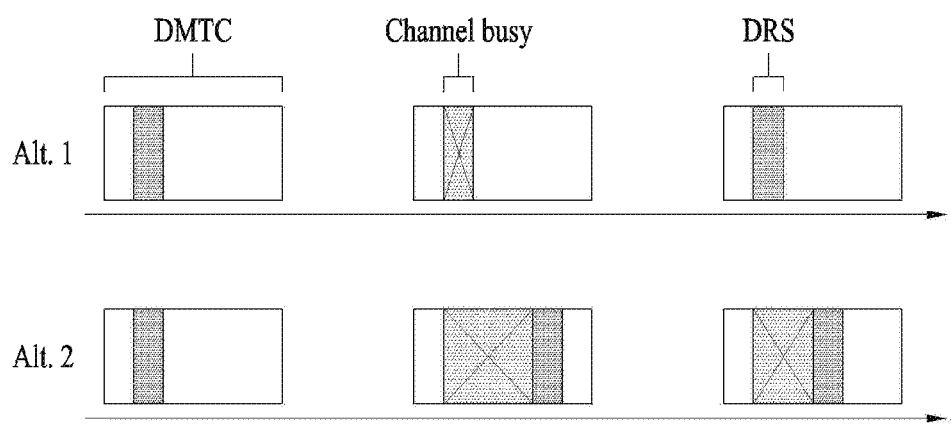
FIG. 10 is a diagram for explaining methods of transmitting a DRS supported in an LAA system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
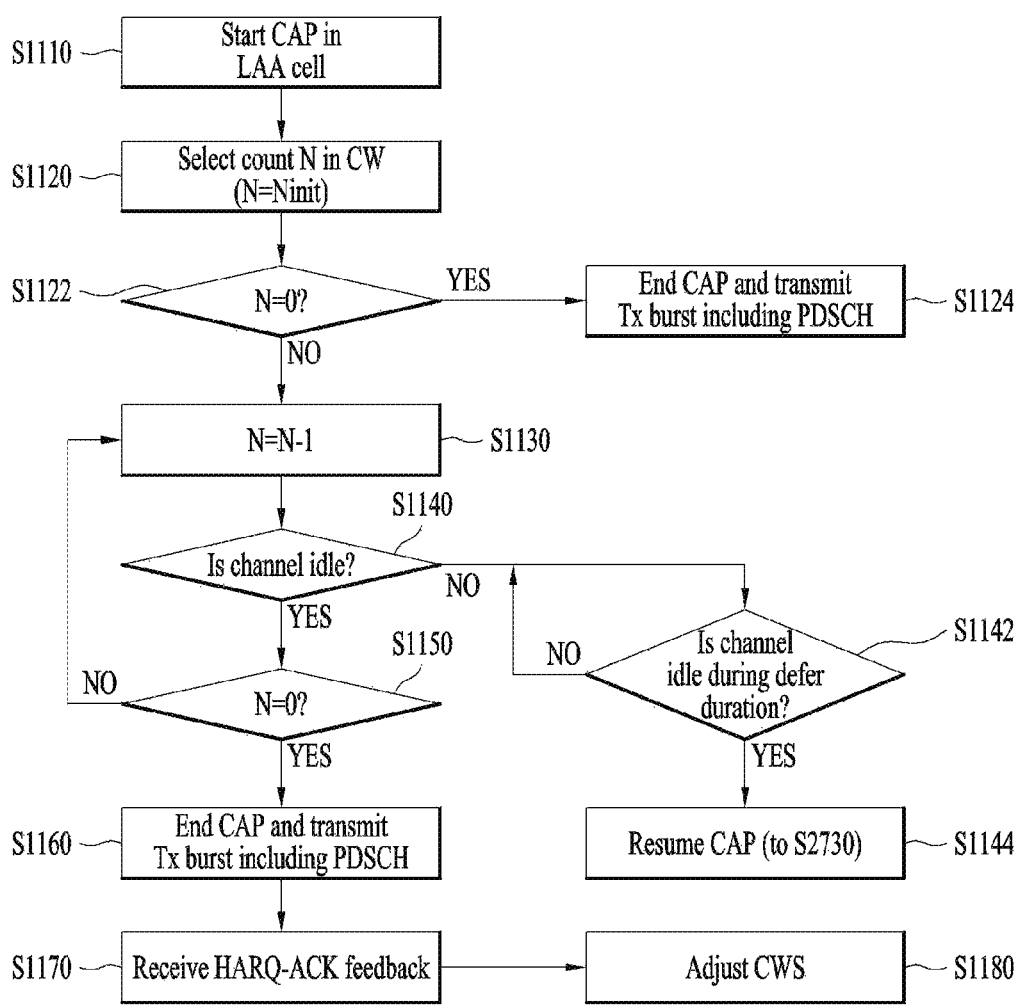
FIG. 11 is a flowchart for explaining CAP and CWA.

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

3. Proposed Embodiment

When a base station or a UE performs LBT (listen-before-talk)-based signal transmission in a wireless communication system consisting of the base station and the UE, the present invention proposes a detail downlink transmission method.

According to the present invention, a base station or a UE should perform LBT to transmit a signal on an unlicensed band. When the base station or the UE transmits a signal, it is necessary to make signal interference not to be occurred with different communication nodes such as Wi-Fi, and the like. For example, according to Wi-Fi standard, a CCA threshold value is regulated by −62 dBm and −82 dBm for a non-Wi-Fi signal and a Wi-Fi signal, respectively. In particular, if an STA (station) or an AP (access point) senses a signal received with power (or energy) equal to or greater than −62 dBm rather than Wi-Fi, the STA or the AP does not perform signal transmission.

In this case, it may be difficult to always guarantee DL transmission of an eNB or UL transmission of a UE on an unlicensed. Hence, a UE operating on the unlicensed band may maintain access with a different cell operating on a licensed band to stably control mobility, RRM (radio resource management) function, and the like. In the present invention, for clarity, a cell accessed by a UE on the unlicensed band is referred to as a U-Scell (or LAA Scell) and a cell accessed by the UE on the licensed band is referred to as a Pcell. As mentioned in the foregoing description, a scheme of performing data transmission/reception on the unlicensed band using a combination with the licensed band is generally called LAA (licensed assisted access).

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |

TABLE 2-continued

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 4 | 7 | 15 | 1023 | 8 or 10 ms | {15, 31, 63, 127, 255, 511, 1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

Figure 12:
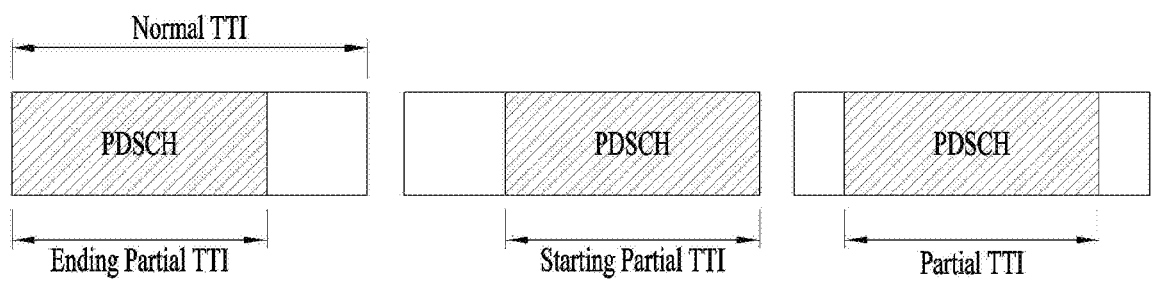
FIG. 12 is a diagram illustrating a partial TTI or a partial subframe applicable to the present invention.

FIG. 12 is a diagram illustrating a partial TTI or a partial subframe applicable to the present invention.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present invention, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 12 illustrates various types of the aforementioned partial TTI. The first drawing of FIG. 12 illustrates an ending partial TTI (or subframe) and the second drawing illustrates a starting partial TTI (or subframe). The third drawing of FIG. 12 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap).

Although the present invention is explained on the basis of a DL operation in FIG. 12, the present invention can also be identically applied to a UL operation. For example, a partial TTI structure shown in FIG. 12 can be applied to a form of transmitting PUCCH or PUSCH as well.

According to an unlicensed band regulation, when a node transmits a signal via an unlicensed band, there may exist a constraint such that the node should occupy more than X % of a system bandwidth. For example, ETSI regulation regulates that more than 80% of a nominal bandwidth should be occupied. When a system has a system bandwidth of 20 MHz, it is able to satisfy the regulation only when transmission is performed by loading 99% of power to 16 MHz band at least.

And, there may exist a constraint on an unlicensed band in the aspect of power spectral density (PSD) as well. For example, according to the ETSI regulation, there may exist a constraint such that a signal should be transmitted while PSD of 10 dBm/1 MHz is satisfied on a partial band. In case of a legacy LTE system, PUCCH can be configured by 1 RB (180 kHz) only on a frequency axis. In this case, if the PUCCH is transmitted on an unlicensed band without transforming the PUCCH, transmit power can be limited by maximum 10 dBm. In this case, since it is difficult for a cell edge UE to reliably transmit PUCCH on an unlicensed band, unnecessary PUSCH retransmission occurs. As a result, an inefficient communication situation can be continued.

The abovementioned PSD problem may also occur in PUSCH transmission. Hence, a UE can transmit PUSCH with a multi-cluster structure or a block-interleaved FDMA (B-IFDMA) structure.

Figure 13:
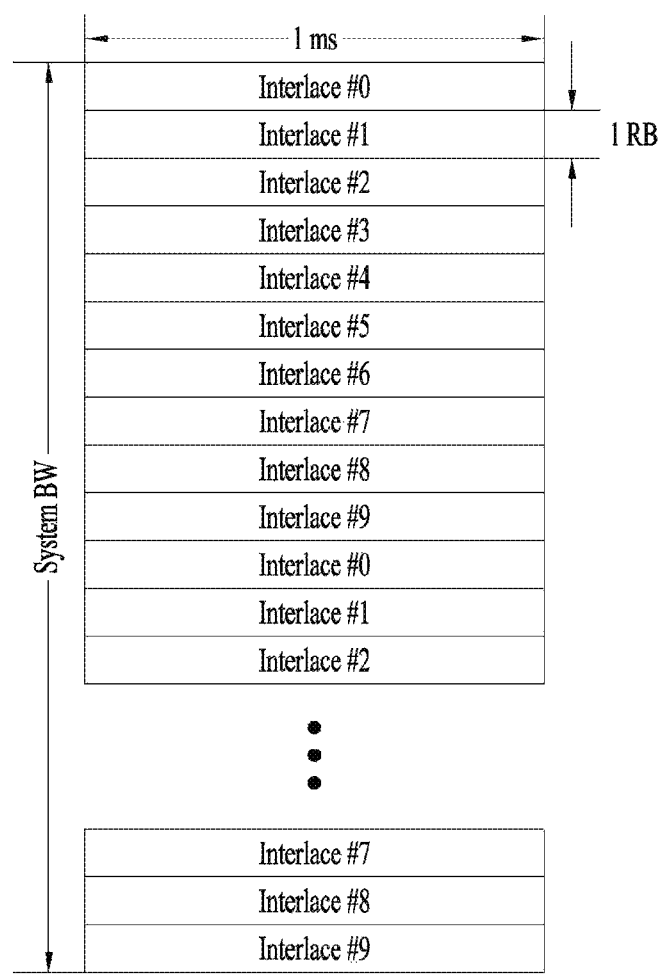
FIG. 13 is a diagram briefly illustrating a block-interleaved FDMA structure applicable to the present invention.

FIG. 13 is a diagram briefly illustrating a block-interleaved FDMA structure applicable to the present invention.

As shown in FIG. 13, when 100 RBs are configured with an interval of 10 RBs in a 20 MHz BW system, the B-IFDMA structure can configure the 10 RBs as a single interlace. In this case, the total 10 interlaces of the same structure may exist. A UE can perform PUSCH transmission in the interlace unit. Or, the UE can be configured to transmit PUSCH in the interlace unit.

In this case, in order to allow both PUSCH transmission and PUCCH transmission to be performed in the same subframe, it is necessary to match a waveform of the PUSCH with a waveform of the PUCCH. The present invention proposes a method of designing PUCCH in consideration of the characteristics above.

3.1. PUCCH Format Proposed in the Present Invention

As mentioned in the foregoing description, when PUCCH is transmitted on an unlicensed band, it is necessary to consider items such as LBT, occupied bandwidth regulation, PSD regulation, B-IFDMA, and the like. In other word, it is necessary to design a new PUCCH in consideration of the items above. The present invention proposes a design configuration or a transmission method considering characteristics of an unlicensed band according to a PUCCH format.

3.1.1. PUCCH Format 1/1a/1b

Figure 14:
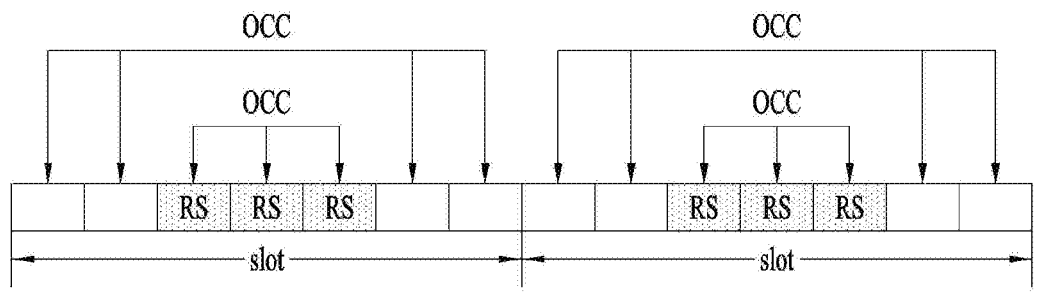
FIG. 14 is a diagram illustrating a configuration of transmitting PUCCH with a PUCCH format 1/1a/1b.

FIG. 14 is a diagram illustrating a configuration of transmitting PUCCH with a PUCCH format 1/1a/1b.

As shown in FIG. 14, in case of PUCCH format 1/1a/1b, a demodulation reference signal (DMRS) is transmitted over 3 symbols of a slot and HARQ-ACK is transmitted over the remaining 4 symbols. The symbol in which HARQ-ACK is transmitted is transmitted after IFFT (Inverse Fast Fourier Transform) is performed in a manner that 12-length CAZAC (Constant Amplitude Zero Auto-Correlation) sequence is multiplied by a modulated HARQ-ACK symbol. If HARQ-ACK has a size of 1 bit, BPSK (Binary Phase Shift Keying) modulation is performed. If HARQ-ACK has a size of 2 bits (2 codewords), QPSK (Quadrature Phase Shift Keying) modulation is performed. In order to make more UEs to be CDM in the same resource, HARQ-ACK symbols are identically configured over 4 symbols and can be transmitted by multiplying length-4 OCC (orthogonal cover code) on a time axis. If cyclic shift of a 12-length CAZAC sequence is utilized as much as possible by 12 and a length-3 OCC of a DMRS is considered, maximum 36 UEs may attempt to transmit HARQ-ACK at the same time in a single PUCCH format 1.

In LTE system, a resource index of PUCCH format 1 is configured by a function of the lowest CCE index of PDCCH. In particular, when an eNB transmits PDSCH in an SF # n and a UE transmits HARQ-ACK in an SF # n+k in response to the PDSCH, the UE can transmit the HARQ-ACK via a PUCCH index of the SF # n+k implicitly linked with the lowest CCE index of PDCCH that schedules the PDSCH in the SF # n. A PUCCH resource can be determined as follows in consideration of PUCCH of the B-IFDMA structure.

3.1.1.1. Method 1 [PUCCH Resource is Determined Via Physical Layer or Higher Layer Signaling]

If PUCCH is configured to be transmitted over all RBs constructing a specific interlace, an eNB can signal an index of the interlace to a UE. Or, if PUCCH is allowed to be transmitted over a part of RBs constructing an interlace, the eNB can signal not only an index of the interlace but also indexes of a part of RBs among RBs belonging to the interlace. In a legacy LTE system, since a resource index of a PUCCH format 1 is determined by a combination of a PRB index, an OCC, cyclic shift, and the like, the eNB can signal at least a part of information described in the following to the UE.

Interlace index

Interlace index and index of RB pair(s) belonging to the interlace (if PUCCH hopping is allowed, index of hopping RB pair)

OCC

Cyclic shift (CS)

All of information above can be configured by RRC signaling or a combination of RRC signaling and a DL grant. For example, 4 sets of {interlace index (and index of RB pair(s)), OCC, cyclic shift} are configured via RRC signaling and one of the 4 sets can be indicated via a partial field (e.g., TPC (Transmit Power Control) field or a newly introduced field) of a DL grant. In particular, specifically, although a PUCCH format 1 is used, it may be able to configure a PUCCH resource without being linked with a PDCCH CCE index.

3.1.1.2. Method 2 [Configuration of link between lowest CCE index of PDCCH and PUCCH resource]

If PUCCH is configured to be transmitted over all RBs constructing a specific interlace, it may be able to define a rule that an interlace index, an OCC, CS, and the like are to be determined via the lowest CCE index of PDCCH.

For example, when PUCCH index candidates are determined by an interlace index, an OCC, and CS in advance, a PUCCH index for transmitting PUCCH can be determined by the lowest CCE index of PDCCH+n (in this case, n can be configured via higher layer signaling or can be determined by a UE ID in advance). As a different example, since it is able to have the lowest CCE index of PDCCH+n greater than the number of PUCCH indexes (# of PUCCH index), the PUCCH index for transmitting PUCCH can be determined by such a rule as mod(PDCCH lowest CCE index+n, # of PUCCH index). In this case, when an interlace index is separately configured via higher layer signaling and there are PUCCH index candidates predetermined by an OCC and CS, a PUCCH index for transmitting PUCCH can be determined by PDCCH lowest CCE index+n (in this case, n can be configured via higher layer signaling or can be determined by a UE ID in advance) from among the PUCCH index candidates.

Or, if PUCCH format 1 is allowed to be transmitted over a part of RBs constructing an interlace, it may be able to determine a rule that an interlace index, an index of an RB pair(s) belonging to the interlace, an OCC, and CS are to be determined via a value of the lowest CCE index of PDCCH. In this case, the number of RB pairs (P_rb) constructing PUCCH can be configured via higher layer signaling (according to a UE).

And, RB pairs belonging to each interlace can be grouped in a specific unit. In this case, a grouping method and the number of RB pairs constructing a group can be configured in advance or can be configured via higher layer signaling. Specifically, the number of RB pairs constructing a group can be configured to be identical with a P_rb value corresponding to the number of RB pairs constructing PUCCH set to each UE. As a specific embodiment, RB pairs are grouped, PUCCH index candidates are configured by a combination of an index of each group, an OCC, CS, and the like, and a PUCCH index for transmitting PUCCH can be determined by an equation of {PDCCH lowest CCE index+n} or mod (PDCCH lowest CCE index+n, # of PUCCH index) from among the PUCCH candidates. In this case, when an interlace index is separately configured via higher layer signaling and there are PUCCH index candidates predetermined by a group index of RB pairs constructing a corresponding interlace, an OCC and CS, a PUCCH index for transmitting PUCCH can be determined by an equation of {PDCCH lowest CCE index+n} or mod (PDCCH lowest CCE index+n, # of PUCCH index) from among the PUCCH index candidates.

If HARQ-ACK information having a size of maximum 2 bits is transmitted via 2 RB pairs or 10 RB pairs, transmission overhead is too big. In order to reduce the transmission overhead, the present invention proposes a method of transmitting HARQ-ACK information having a size greater than a size of 2 bits, although a PUCCH format 1 is transmitted via multi-RB pairs. In the following description, assume that HARQ-ACK information is transmitted via 10 RB pairs. However, a configuration of the present invention can be extensively applied to a case of transmitting the information via the different number of RB pairs rather 10 RB pairs.

If the HARQ-ACK information is transmitted via 10 RB pairs, information of a size of maximum 20 bits can be transmitted. In this case, when the number of bits of HARQ-ACK corresponds to X, a UE may utilize an encoding scheme of (Y, X). If Y is greater than 20, the UE performs truncation. If the Y is less than 20, the UE performs repetition. By doing so, the UE can set the number of coded bits to 20. For example, the UE utilizes (20, X) Reed Muller code for transmitting a PUCCH format 2 to transmit HARQ-ACK having a size of maximum 13 bits. If 20 coded bits are generated using the method above, the UE divides the coded bits into 10 coded bits each of which has 2 bits and can map 2-bit information in a unit of an RB pair.

The UE can transmit HARQ-ACK information of a size of maximum 2 bits according to a legacy method or transmit coded bits in a unit of an RB pair according to the proposed method. The decision can be made according to a UE. Or, the abovementioned configuration can be configured according to the number of bits of HARQ-ACK to be transmitted by a UE.

3.1.2. PUCCH Format 3

Figure 15:
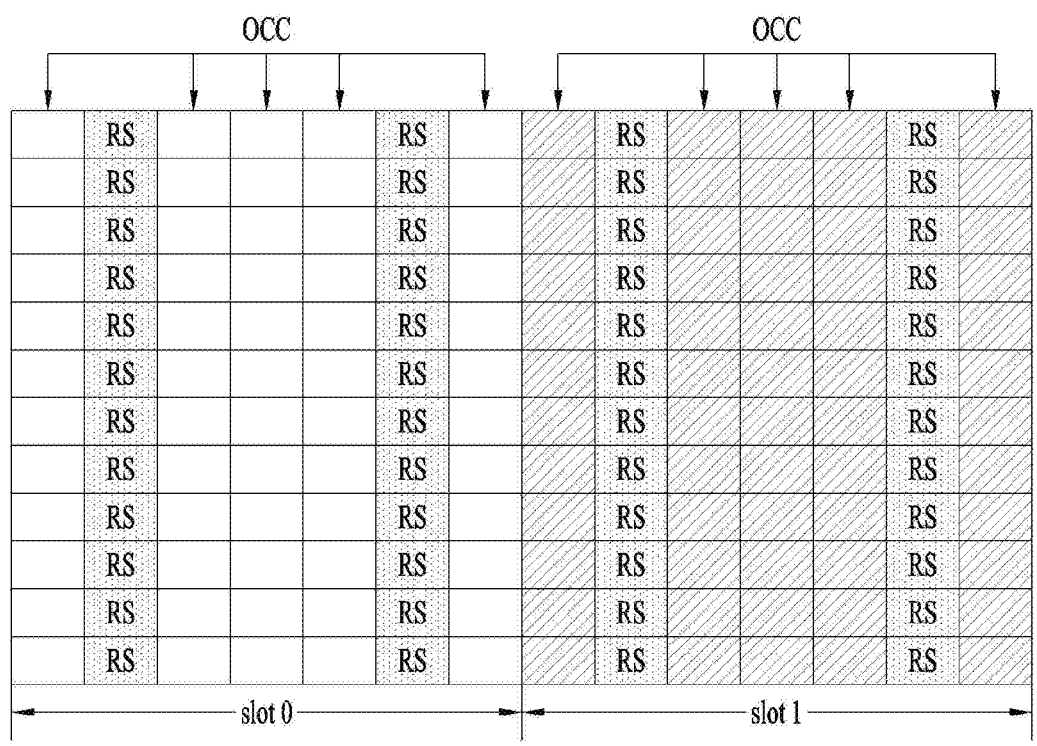
FIG. 15 is a diagram illustrating a configuration of transmitting PUCCH with a PUCCH format 3.

FIG. 15 is a diagram illustrating a configuration of transmitting PUCCH with a PUCCH format 3.

As shown in FIG. 15, in case of a PUCCH format 3, if a data symbol on which DFT (Discrete Fourier Transform) spread is performed using 12 subcarriers is repeatedly transmitted over 5 symbols according to a slot and length-5 OCC is multiplied by a time axis, maximum 5 UEs can be CDMed. In this case, since a single QPSK symbol is transmitted according to an RE, 48 coded bits can be transmitted within 1 RB pair.

Figure 16:
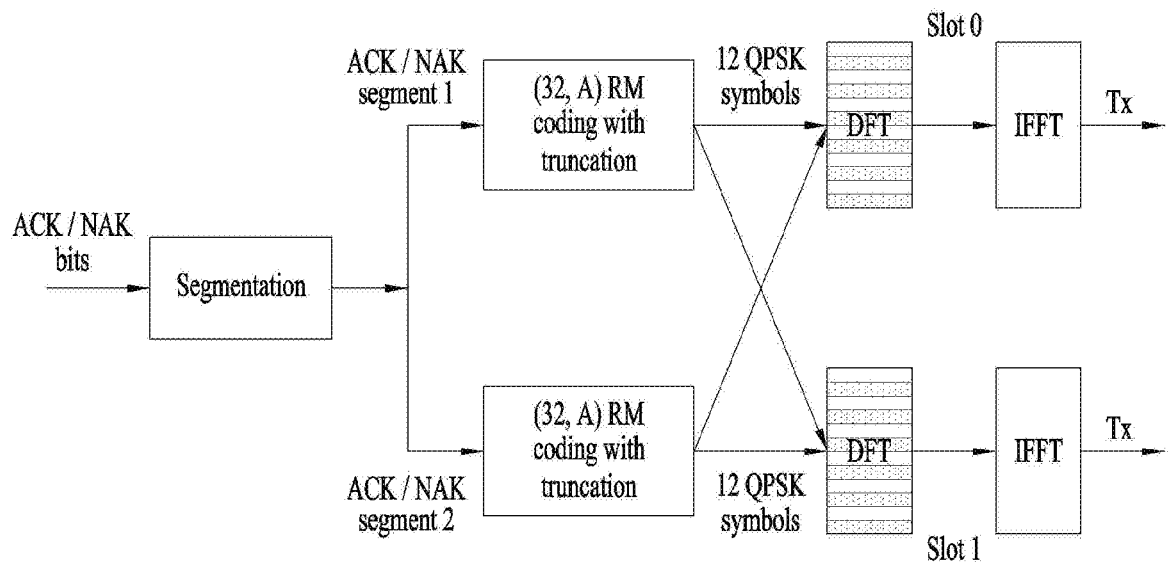
FIG. 16 is a diagram illustrating a detail operation of transmitting PUCCH with a legacy PUCCH format 3.

FIG. 16 is a diagram illustrating a detail operation of transmitting PUCCH with a legacy PUCCH format 3.

In case of performing encoding on 48 coded bits, a different channel coding method is defined according to the number of transmission bits. Specifically, if an input bit-stream A is equal to or less than 11 bits, a UE performs (32, A) single RM coding and generates 48 coded bits via circular repetition.

In this case, if an input bit stream is greater than 11 bits and is equal to or less than 21 bits, a UE uses a dual RM code and, as shown in FIG. 16, divides the input bit stream into two segments. Subsequently, the UE applies (32, A) RM code to each segment and generates information of a size of 24 bits via truncation. Subsequently, the UE performs symbol interleaving on the 24-bit size outputted from each segment and transmits the information in each slot.

The present invention proposes a method of transmitting a PUCCH format 3 via multi-RB pairs.

Figure 17:
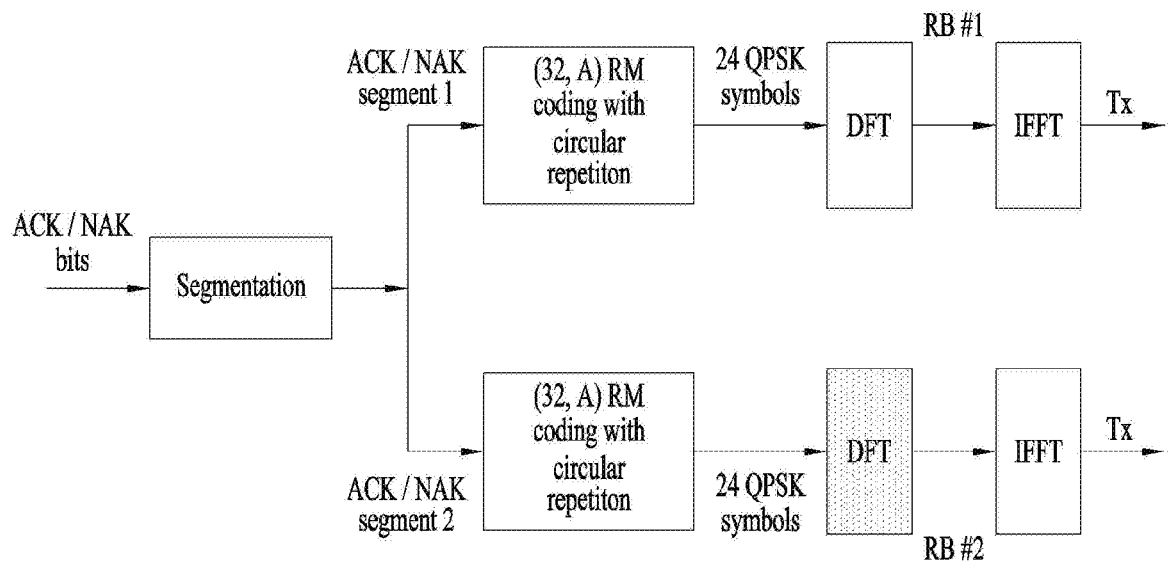
FIG. 17 is a diagram illustrating a detail operation of transmitting PUCCH with a PUCCH format 3 proposed in the present invention.

FIG. 17 is a diagram illustrating a detail operation of transmitting PUCCH with a PUCCH format 3 proposed in the present invention.

For example, HARQ-ACK information can be simply repeated in a unit of an RB pair. Or, in order to make more UEs to be CDM, it may apply a frequency axis OCC in a unit of an RB pair(s).

As a different example, in case of multi-RB pairs, since it is not limited by 48 coded bits, a UE transmits HARQ-ACK information without performing truncation on a dual RM coding case. By doing so, it is able to increase a reception success probability of an eNB. Specifically, as shown in FIG. 17, a UE can perform PUCCH format 3 dual RM coding using 2 RB pairs. In this case, the UE performs circular repetition on each segment, generates 48 coded bits, and can transmit the bit information via each of RB pairs. In this case, if HARQ-ACK information is transmitted via RB pairs greater than 2 RB pairs, the UE can multiply a frequency axis OCC after repetition is performed in a unit of 2 RB pairs. Or, the UE generates more coded bits for each segment and may be able to transmit the bit information via multi-RB pairs.

As a further different example, a size of an input bit stream is not limited by a size of 21 bits and it may allow information on more HARQ-ACK bits to be transmitted. For example, when a UE transmits ACK/NACK information configured by a size of 42 bits, the UE divides the information into information of a size of 21 bits, applies a legacy method to each of the information of the size of 21 bits, and cam transmit each of the information via 2 RB pairs. Or, the UE may transmit the information via RB pairs greater than 2 RB pairs by utilizing the aforementioned methods.

Or, the number of RB pairs constructing a PUCCH format 3 can be differently defined according to a size of an input bit stream. For example, if a size of an input bit stream is equal to or less than 21 bits, a UE transmits PUCCH via 2 RB pairs. If the size of the input bit stream is greater than 21 bits and is equal to or less than 42 bits, the UE can be configured to transmit PUCCH via 4 RB pairs. Or, if the size of the input bit stream is equal to or greater than Z bits, as shown in FIG. 15, the UE performs QPSK modulation on PUCCH by utilizing a TBCC (Tail-Biting Convolutional Code) rather than RM to transmit the PUCCH.

In LTE system, a PUCCH resource in which a PUCCH format 3 is transmitted is configured by a combination of RRC signaling and a DL grant. Similar to the method proposed for the PUCCH format 1, the present invention proposes a method of determining a PUCCH resource according to the whole of a specific interlace or a part of RB pair(s) among the specific interlace allocated as a resource of the PUCCH format 3.

<Option 1>

If a PUCCH resource is allocated by the whole of a specific interlace, candidates of PUCCH resource indexes can be configured by a combination of a interlace index, OCC, CS, and the like in advance. An eNB indicates the N (e.g., N=4) number of PUCCH resource index sets among the candidates of the PUCCH resource indexes via RRC signaling and can indicate a set among the N number of PUCCH resource index sets via a partial field (e.g., TPC field of a newly introduced field) of a DL grant. In this case, if an interlace index, which is to going to be utilized as PUCCH, is configured by higher layer signal in advance according to a UE, it may be able to determine a PUCCH resource set using a combination of an OCC and CS only without the interlace index.

<Option 2>

If PUCCH is allowed to be transmitted over a part of RB pairs constructing an interlace as well as the whole of a specific interlace, it is able to configure PUCCH resource index candidates not only by an index of the interlace but also by a combination of indexes of a part of RB pairs (or a group configured by RB pairs) among RB pairs belonging to the interlace and an OCC, CS, and the like. And, the N (e.g., N=4) number of PUCCH resource index sets among the PUCCH resource indexes candidates can be configured via RRC signaling and a set among the N number of PUCCH resource index sets can be indicated via a partial field (e.g., TPC field of a newly introduced field) of a DL grant. In this case, if an interlace index, which is going to be utilized as PUCCH, is configured by higher layer signal in advance according to a UE, a PUCCH resource index for transmitting PUCCH can be determined by a combination of indexes of a part of RB pairs (or a group configured by RB pairs) among RB pairs belonging to the interlace, an OCC (without an interlace index), and CS only.

3.1.4. PUCCH Format 4

Figure 18:
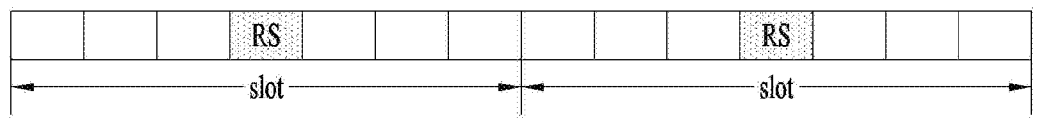
FIG. 18 is a diagram illustrating a configuration of transmitting PUCCH with a PUCCH format 4.

FIG. 18 is a diagram illustrating a configuration of transmitting PUCCH with a PUCCH format 4.

If carriers more than 5 CCs are aggregated, HARQ-ACK information of a size equal to or greater than 21 bits can be generated. In this case, it may be inappropriate to transmit the information using a legacy PUCCH format 3 only. Hence, release-13 system newly proposes a PUCCH format 4 and a PUCCH format 5 capable of transmitting more HARQ-ACK information. The PUCCH format 4 basically follows a PUSCH structure and has a characteristic that CDM is not allowed between UEs.

Specifically, as shown in FIG. 18, a position of a DMRS is identical to a position of PUSCH. A UE attaches a CRC (Cyclic Redundancy Check) to HARQ-ACK having a size equal to or greater than 22 bits, performs encoding using a TBCC, and can transmit QPSK modulated symbols using a time-first mapping method. And, the PUCCH format 4 can support multiple RB pairs. Among 1/2/3/4/5/6/8 RB pairs, information on a unit of RB pairs for transmitting HARQ-ACK information can be configured via RRC.

If partial PUCCH formats are allowed to be transmitted only for LAA Scell, HARQ-ACK information having a size less than 22 bits can also be transmitted via the PUCCH format 4. In this case, a channel coding scheme can be differently defined according to an input bit stream. In order to prepare for channel coding misalignment between an eNB and a UE, a sequence (root index and/or cyclic shift and/or OCC) of a DMRS can be differently configured according to channel coding. For example, if a size of an input bit stream is equal to or less than 11 bits, a single RM code can be attached to the input bit stream to apply TBCC. If a size of an input bit stream is equal to or less than 21 bits, a dual RM code can be attached to the input bit stream to apply TBCC. If a size of an input bit stream is equal to or greater than 22 bits, a CRC can be attached to the input bit stream to apply TBCC.

In LTE system, a PUCCH resource in which a PUCCH format 4 is transmitted can also be configured by a combination of RRC signaling and a DL grant. And, since multiple RB pairs (i.e., 1/2/3/4/5/6/8) correspond to a signal PUCCH resource, each of PUCCH resource indexes can be determined by a combination of an initial RB pair index, number of RB pair(s), OCC, and CS.

When LAA Scell uses B-IFDMA PUSCH, there may exist a constraint that PUCCH format 4 exists in a specific interlace only. For example, assume that total 10 RB pairs ranging from an RB #0 to an RB #9 exist in an interlace #0 and a PUCCH resource is sequentially allocated from an RB pair having a low index. In this case, if an initial RB pair index corresponds to #8, the number of RB pairs can be restricted to 1 or 2. If 3 RB pairs are allocated, RB #8, RB #9, and RB #0 are allocated in an interlace #0. If 4 RB pairs are allocated, it may be able to define a rule that RB #8, RB #9, RB #0, and RB #1 are to be allocated in an interlace #0.

If PUCCH is transmitted via multiple RB pairs, transmission using RB pairs more than a configuration defined in release-13 system can be allowed. For example, according to a configuration defined in eCA of release-13 system, transmission of 4 RB pairs can be configured in LAA Scell for PUCCH configured by 2 RB pairs. In this case, in order to simply perform repetition in a unit of 2 RBs or in order to make more UEs to be CDMed, it may be able to introduce a frequency axis OCC in a unit of 2 RBs.

3.1.4. PUCCH Format 5

Figure 19:
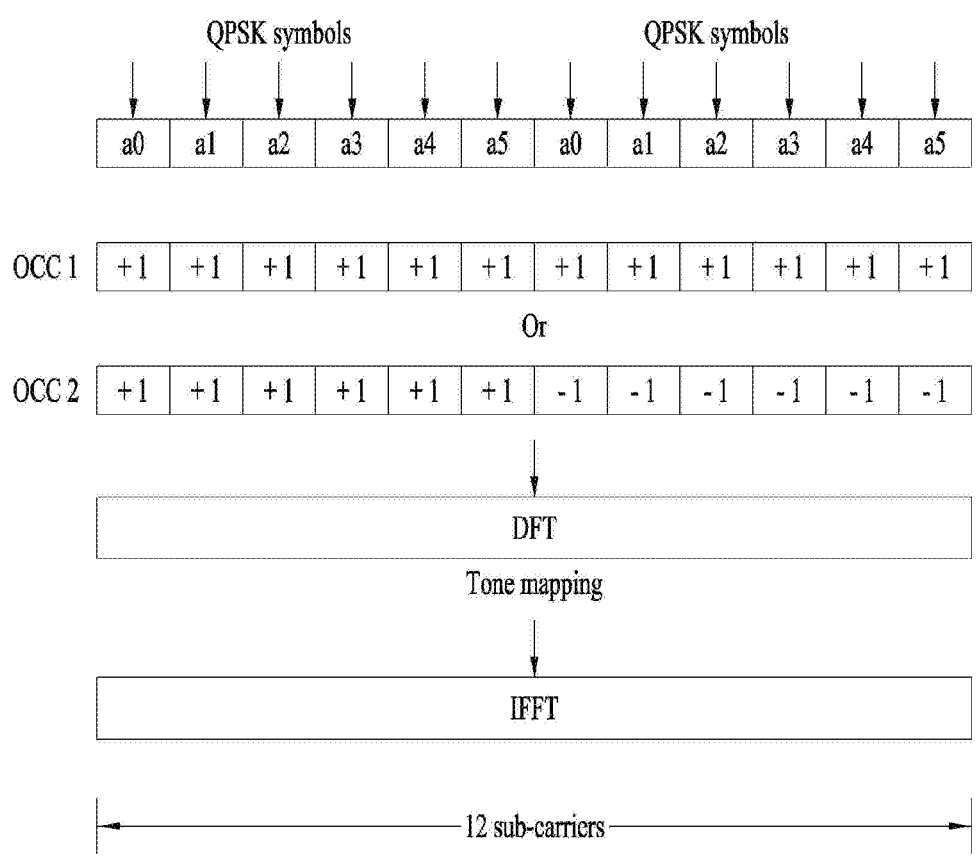
FIG. 19 is a diagram illustrating a configuration of transmitting PUCCH with a PUCCH format 5.

FIG. 19 is a diagram illustrating a configuration of transmitting PUCCH with a PUCCH format 5.

Unlike PUCCH format 4, PUCCH format 5 can be configured by 1 RB only. As shown in FIG. 19, 1 PRB is divided into two parts in a unit of 6 subcarriers on a frequency axis and 2-length OCC is applied to each of the two parts. HARQ-ACK information is included in 72 REs and maximum 2 UEs can be CDMed.

In LTE system, a PUCCH resource in which the PUCCH format 5 is transmitted is configured by a combination of RRC signaling and a DL grant. In the present invention, similar to the methods proposed for the PUCCH format 3, a method of determining a PUCCH resource as a resource of the PUCCH format 5 according to the whole of a specific interlace or a part of RB pairs is proposed.

<Option 1>

If a PUCCH resource is allocated by the whole of a specific interlace only, candidates of PUCCH resource indexes are configured in advance by a combination of an interlace index, OCC, CS, and the like. An eNB indicates the N (e.g., N=4) number of PUCCH resource index sets among the candidates of the PUCCH resource indexes via RRC signaling and can indicate a set among the N number of PUCCH resource index sets via a partial field (e.g., TPC field or a newly introduced field) of a DL grant.

<Option 2>

If PUCCH is allowed to be transmitted over a part of RB pairs constructing an interlace as well as the whole of a specific interlace, it is able to configure PUCCH resource index candidates not only by an index of the interlace but also by a combination of indexes of a part of RB pairs (or a group configured by RB pairs) among RB pairs belonging to the interlace and an OCC, CS, and the like. And, the N (e.g., N=4) number of PUCCH resource index sets among the PUCCH resource indexes candidates can be configured via RRC signaling and a set among the N number of PUCCH resource index sets can be indicated via a partial field (e.g., TPC field of a newly introduced field) of a DL grant. In this case, if an interlace index is configured by higher layer signal in advance according to a UE, a PUCCH resource index can be configured by a combination of indexes of a part of RBs among RBs belonging to the interlace, an OCC, and the like.

Similar to the PUCCH format 4, a channel coding scheme can be differently defined according to an input bit stream. In order to prepare for channel coding misalignment between an eNB and a UE, a sequence (root index and/or cyclic shift and/or OCC) of a DMRS can be differently configured according to channel coding. If PUCCH is transmitted via multiple RBs, PUCCH can be simply repeated in a unit of an RB. Or, in order to make more UEs to be CDM, it may be able to introduce a frequency axis OCC in a unit of an RB in which the PUCCH is transmitted.

3.1.5. PUCCH Format Common Issue

Similar to a case that a UE receives a scheduling grant for a cell in which PUCCH is to be transmitted only, if HARQ-ACK information has a size equal to or less than 2 bits, the UE is configured to fall back to PUCCH format 1a/1b. On the other hand, if an ARI value is configured via a TPC field of a scheduling grant for a cell in which PUCCH is not transmitted, the UE transmits HARQ-ACK via a PUCCH resource indicated by the ARI value. In this case, if PUCCH format 1 is not transmitted in LAA Scell, it is necessary to newly define a fallback operation of the UE.

To this end, as a method, the UE can be configured to transmit HARQ-ACK via a licensed band on which PUCCH is transmitted or a PUCCH format 1 resource of Pcell. In this case, a PUCCH format 1 index can be linked with the lowest CCE index of PDCCH of LAA Scell.

As a different method, although an ARI value is not determined by a scheduling grant due to a configured default ARI value (e.g., ARI=0), a UE can transmit HARQ-ACK via a PUCCH resource indicated by the default ARI value.

Since PUCCH is transmitted on an unlicensed band, PUCCH transmission can be allowed only when a UE succeeds in performing LBT. When PUCCH transmission is allowed to specific LAA Scell(s) only among a plurality of LAA Scells, if a UE fails to perform LBT in the specific LAA Scell(s), PUCCH transmission can be delayed.

Hence, HARQ-ACK can be transmitted in LAA Scell in response to PDSCH transmitted in the LAA Scell only. In particular, when PUCCH is not transmitted due to the LBT failure of a UE, a loss may occur. In this case, it is preferable to distribute the loss to a plurality of Scells. In particular, when HARQ-ACK is transmitted in response to PDSCH transmitted in LAA Scell #1, the HARQ-ACK can be transmitted in the LAA Scell #1 only.

In this case, although an ARI value is not configured by a DL scheduling grant, a UE may transmit PUCCH with a PUCCH format x. In other word, in LTE system, since a TPC field (if DAI (Downlink Assignment Index) field exists, a value of the field is 1) of a DL grant for a cell in which PUCCH is transmitted is utilized for PUCCH TPC, if a UE fails to obtain an ARI value, the UE is unable to know an ARI value to be applied. In particular, when UCI is transmitted in a corresponding subframe, if it is necessary to transmit the UCI with a PUCCH format 3/4/5, since the UE is unable to know an ARI value, the UE is unable to know a PUCCH resource index. In order to solve the problem above, the present invention proposes methods described in the following.

[Method 1] A UE changes a TPC field of a DL grant, which schedules LAA Scell, with an ARI value and may be able to apply the ARI value.

[Method 2] A PUCCH resource for a PUCCH format x can be configured via RRC configuration (or physical layer signaling) irrespective of an ARI value. In other word, a UE can transmit PUCCH via a PUCCH resource which is configured via RRC configuration (or physical layer signaling) irrespective of an ARI value.

[Method 3] A PUCCH resource for a PUCCH format x can be configured to be linked with the lowest CCE index of PDCCH. As mentioned earlier in the method 2 of the paragraph 3.1.1, it may be able to define a new rule.

The abovementioned proposal can be applied to a case that a cell group is configured by unlicensed band(s) only.

Or, an eNB can designate a cell in which HARQ-ACK (or UCI) is transmitted via a DL grant. In particular, the eNB indicates HARQ-ACK (or UCI) for a plurality of cells to be transmitted via a single cell to increase PUCCH transmission probability.

A UE can transmit a scheduling request (SR) to an eNB to additionally request a UL resource or report a buffer status. In this case, the SR can be transmitted with a PUCCH format 1/3/4/5. In LAA Scell, LBT should be performed to perform UL transmission. Hence, it may not be preferable to allow SR transmission in the LAA Scell. However, the SR transmission can be allowed on an unlicensed band in consideration of dual connectivity-based LAA or standalone LAA in the future.

In LTE system, SR transmission is allowed not only in Pcell but also in Scell in which PUCCH is transmitted. A UE can determine or select a cell in which an SR is to be transmitted from among the Pcell and the Scell. In particular, when SR transmission via an unlicensed band as well as a licensed band is allowed, if a UE fails to transmit an SR via an unlicensed band due to the failure of LBT, it may be able to define at least one of operations described in the following (to prevent SR transmission delay from being considerably increased).

[Operation 1] An SR is transmitted on a licensed band only. In particular, a UE can be configured to transmit an SR on a licensed band only.

[Operation 2] A UE can trigger a contention-based PRACH procedure on a licensed band.

[Operation 3] A UE can report information on whether or not SR transmission fails or statistical information on SR transmission failure to an eNB via a licensed band.

The operation(s) above can be defined only when SR transmission is not attempted on an unlicensed band during T ms or due to the N number of LBT failures.

3.2. Method of Transmitting PUCCH Proposed in the Present Invention

In addition, the present invention proposes a method of transmitting PUCCH in consideration of a PSD related regulation on an unlicensed band, an occupied bandwidth related regulation, LBT, and the like.

3.2.1. PSD

According to unlicensed band regulation, when a node performs transmission via an unlicensed band, there may exist a constraint in the aspect of power spectral density (PSD). For example, according to the ETSI regulation, there may exist a constraint such that a signal should be transmitted while PSD of 10 dBm/1 MHz is satisfied on a partial band. In case of a legacy LTE system, PUCCH can be configured by 1 RB (180 kHz) only on a frequency axis. In this case, if the PUCCH is transmitted on an unlicensed band without transforming the PUCCH, transmit power can be limited by maximum 10 dBm. In this case, since it is difficult for a cell edge UE to reliably transmit PUCCH on an unlicensed band, unnecessary PUSCH retransmission occurs. As a result, an inefficient communication situation can be continued.

According to the present invention, in order to solve the problem above, a UE can transmit PUCCH with a multi-cluster structure or a block-interleaved FDMA (B-IFDMA) structure. However, a cell edge UE can sufficiently and reliably transmit PUCCH with power of 10 dBm and transmission can be allowed to be transmitted by loading power to 1 RB without any restriction in a region where PSD-related regulation does not exist. In particular, information on allowed PUCCH transmission among legacy PUCCH transmission and PUCCH transmission of B-IFDMA structure can be configured via physical layer signaling or higher layer signaling according to a UE. Similarly, when PUSCH is transmitted, an RA method to be used for transmitting PUSCH among a legacy PUSCH resource allocation method and an RA method in a form of B-IFDMA form can be configured via physical layer signaling or higher layer signaling. The abovementioned two configurations are interlocked with single signaling and the single signaling can indicate one of the two RA methods.

3.2.2. Occupied Bandwidth (BW)

In the aspect of an occupied BW, a constraint may exist on an unlicensed band regulation. In particular, when a node transmits a signal via an unlicensed band, there may exist a constraint such that the node should occupy more than X % of a system bandwidth. For example, ETSI regulation regulates that more than 80% of a nominal bandwidth should be occupied. When a system has a system bandwidth of 20

MHz, it is able to satisfy the regulation only when transmission is performed by loading 99% of power to 16 MHz band at least.

For example, when PUCCH is transmitted with the B-IFDMA structure, a PUCCH resource can be sequentially configured from both ends of a carrier among RB pairs belonging to each interlace.

Figure 20:
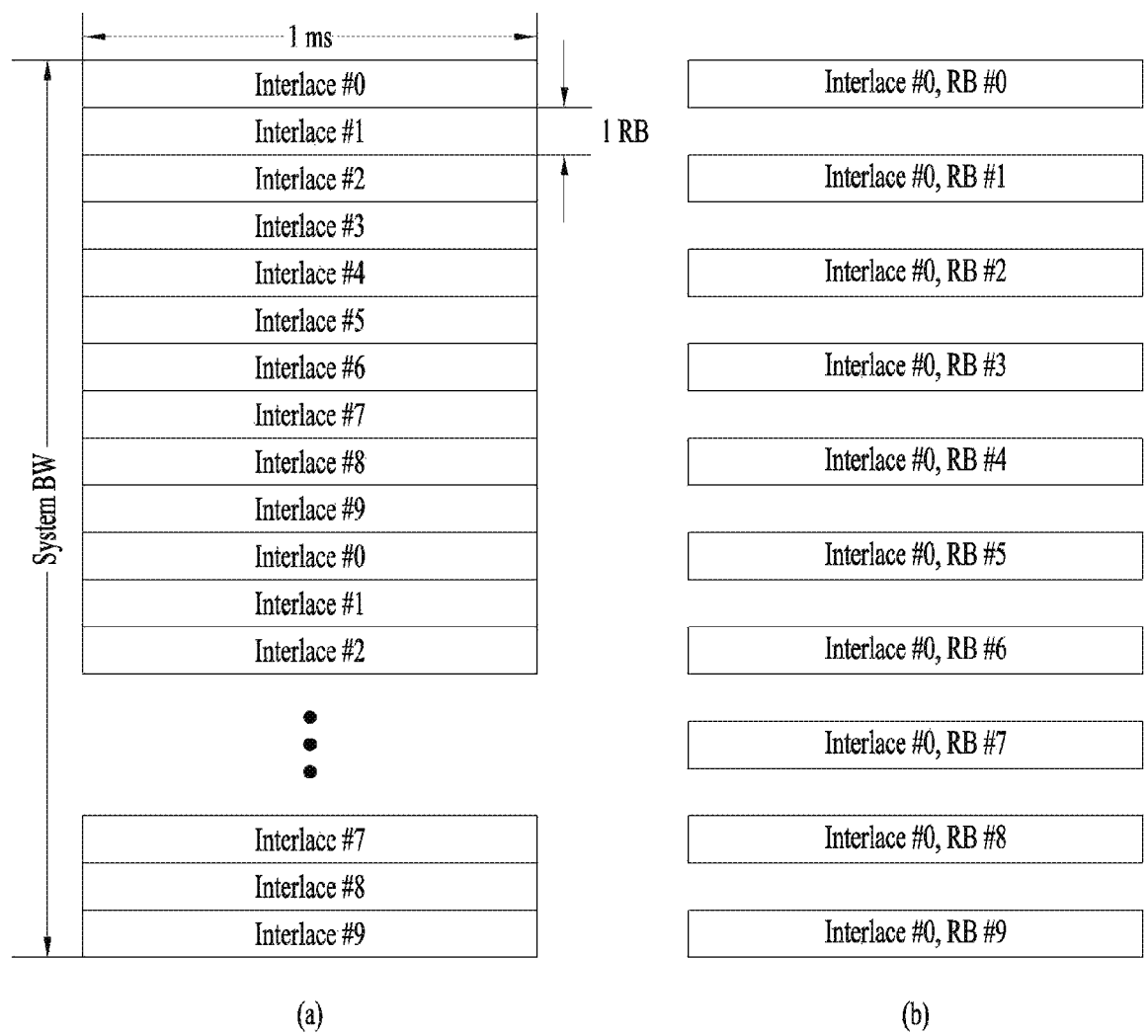
FIG. 20 is a diagram briefly illustrating a PUCCH resource according to an example of the present invention.

FIG. 20 is a diagram briefly illustrating a PUCCH resource according to an example of the present invention.

For example, as shown in FIG. 20, when 100 RBs are configured with an interval of 10 RBs in a 20 MHz BW system, if the 10 RBs are configured as a single interlace, the total 10 interlaces of the same structure may exist. In this case, when a PUCCH resource is set to an interlace #0, the PUCCH resource can be configured to be sequentially set from an RB pair of an RB #0 and an RB #9.

Figure 21:
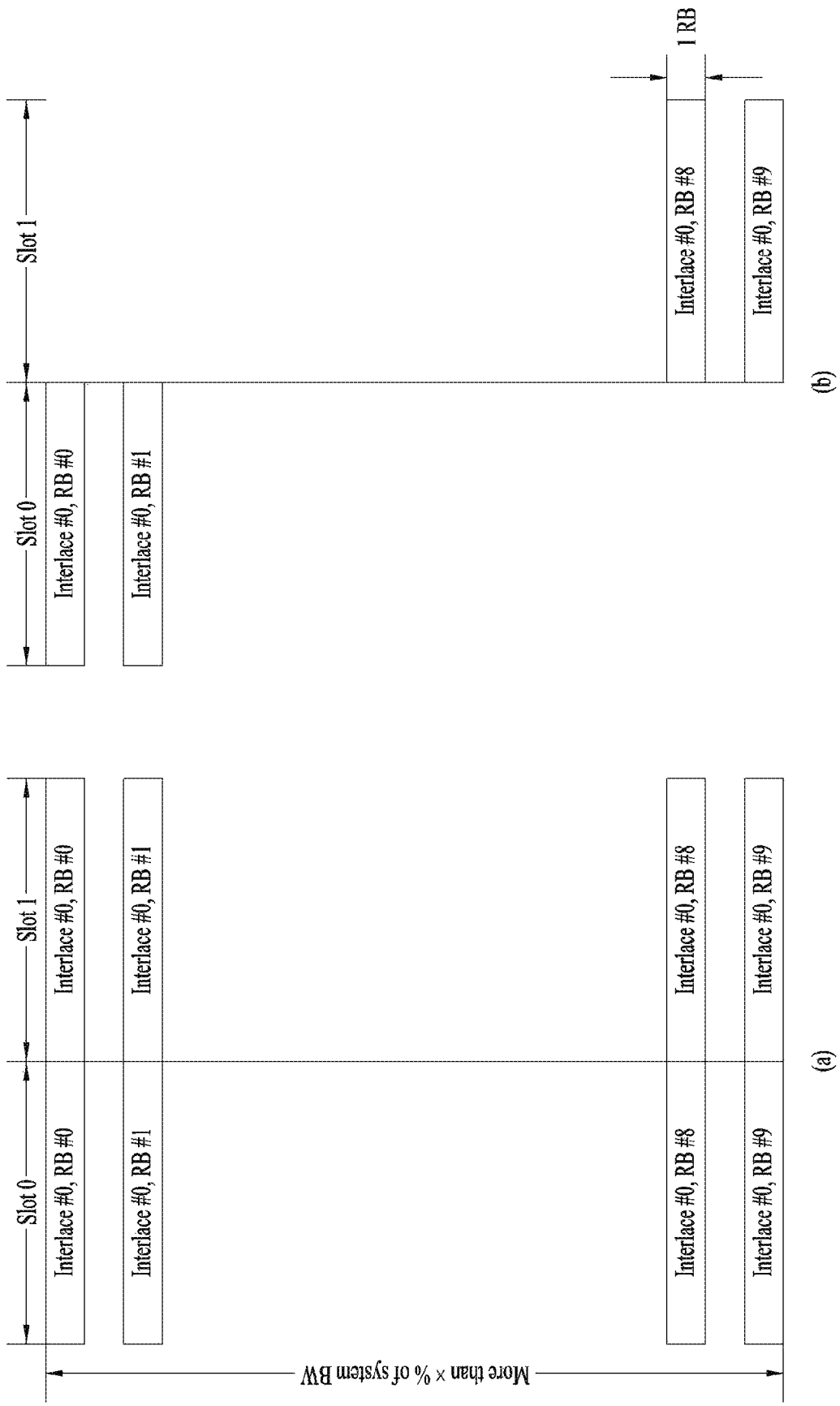
FIG. 21 is a diagram briefly illustrating a PUCCH resource according to a different example of the present invention.

FIG. 21 is a diagram briefly illustrating a PUCCH resource according to a different example of the present invention.

As a different example, the aforementioned resource allocation method can be differently applied according to whether or not PUCCH hopping is introduced. FIG. 21(a) illustrates a PUCCH resource configuration method when PUCCH hopping is not introduced. In order to satisfy an occupied bandwidth related regulation, at least one PUCCH resource should be configured by 2 RB pairs (RB #0 and RB #9 pairs) positioned at both ends of an interlace. On the other hand, FIG. 21(b) illustrates a PUCCH resource configuration method when PUCCH hopping is introduced. If a PUCCH resource is configured by a single RB pair only, it is able to satisfy the occupied bandwidth related regulation.

In addition, if RB pairs rather than a PUCCH resource of an interlace #0 are allocated to PUSCH to utilize a resource as much as possible, it may consider a configuration of hopping the PUSCH as well in consideration of PUCCH hopped in a slot unit. For example, when PUSCH hopping is indicated via physical layer signaling or higher layer signaling, if PUSCH is assigned to RB #2 to RB #9 pairs in a slot 0, it may be able to define a rule that a UE transmits PUSCH in RB #0 to RB #7 pairs in a slot 1. A PUCCH hopping method may define a rule that an RB position of a slot 0 is to be apart from an RB position of a slot 1 as much as possible to satisfy the occupied bandwidth related regulation. More generally, the PUCCH hopping method may define a rule that PUCCH is to hop to a different RB position between slots to obtain a frequency diversity effect (or to randomize inter-cell interference effect).

3.2.3. PUCCH Transmission Timing

In LAA Scell of Release-14 system, although a DL subframe and a UL subframe may coexist in a single carrier, unlike a preconfigured frame structure type 2, a DL/UL SF structure can be dynamically changed based on scheduling of an eNB. And, since it is unable to anticipate success/failure of LBT of the eNB in advance, if the DL/UL SF structure is configured in advance, it may cause inefficient utilization of a resource. Hence, the present invention proposes a method of configuring PUCCH transmission timing in consideration of an operation characteristic of an unlicensed band.

For example, when an eNB schedules PDSCH via a DL grant, the eNB can signal PUCCH transmission timing to a UE at the same time.

As a different example, PUCCH transmission timing can be determined based on blind detection (BD) of a UE performed on a CRS (Cell-specific Reference Signal) and/or a common PDCCH. Specifically, when HARQ-ACK is transmitted in response to PDSCH received in an SF # n, the HARQ-ACK information can be configured to be transmitted in a first subframe (or within m number of subframes from the first subframe), which is determined as a non-DL subframe or a UL subframe (by performing BD on a CRS and/or a common PDCCH) among subframes appearing after an SF # n+k (k is configured in advance or is configured via higher layer signaling).

As a further different example, PUCCH transmission timing can be configured by a combination of the aforementioned two methods. Specifically, a UE may attempt to transmit PUCCH at the timing indicated by a received DL grant. In this case, if a corresponding subframe is determined as a DL subframe (by performing BD on a CRS and/or a common PDCCH), the UE may attempt to transmit HARQ-ACK in a subframe appearing after a subframe at which DL burst ends.

The aforementioned various configurations of PUCCH transmission timing can be identically applied to a case that UCI information such as HARQ-ACK and/or CSI is piggybacked via an unlicensed band PUSCH.

3.2.4. Multi-SF HARQ-ACK Transmission

When a UE receives PDSCH via consecutive subframes, each of PUCCH transmission timings for the PDSCH is different, and there is no PUSCH to be transmitted at PUCCH transmission timing, if the UE continuously transmits control information, system performance can be deteriorated. As a method for solving the problem above, the present invention proposes multi-SF transmission. In the following, a method of configuring a multi-SF HARQ-ACK codebook according to the present invention is explained in detail.

For example, a UE can configure a HARQ-ACK codebook configured by a size of 1 bit according to a subframe.

As a different example, a UE can perform bundling on a subframe domain in a single CC. Specifically, when the UE transmits HARQ-ACK information in an SF # n, HARQ-ACK corresponding to a single CC can be always configured by a size of 1 bit. In particular, the number of bits of a HARQ-ACK codebook can be matched with the number of CCs transmitted in a corresponding subframe.

As a further different example, a UE can perform bundling not only on a subframe domain but also on a CC domain in a single CC. Specifically, when the UE transmits HARQ-ACK information in an SF # n, the HARQ-ACK information can be always configured by a size of 1 bit. Or, the HARQ-ACK information can be configured by a size of 2 bits in consideration of two codewords.

The abovementioned various configurations of the HARQ-ACK codebook can be identically applied to a case that UCI information such as HARQ-ACK and/or CSI is piggybacked via an unlicensed band PUSCH.

3.2.5. LBT

An LBT method more advantageous compared to an LBT method set to PUSCH can be set to PUCCH (hereinafter, the LBT method is referred to as fast LBT). In this case, the fast LBT can include an LBT method starting transmission when a channel is determined as idle after channel sensing is performed on the channel during shorter time, an LBT method of configuring a smaller contention window size, and an LBT method to which a higher energy detection threshold value is set. In this case, LBT related information can be configured in advance via physical layer signaling or higher layer signaling.

The LBT method set to the PUCCH described in the present paragraph 3.3.5 can be identically applied to UL transmission including UCI information. In this case, the UL transmission including the UCI information may correspond to PUSCH transmission including UCI. Moreover, the UL transmission including the UCI information may correspond to PUSCH transmission including UCI only without UL-SCH.

3.2.5.1 Method 1

If a UE attempting to simultaneously transmit PUSCH and PUCCH in a specific SF # n succeeds in LBT for transmitting PUSCH, the UE is allowed to transmit not only PUSCH but also PUCCH. In other word, if a UE attempting to simultaneously transmit PUSCH and PUCCH in a specific SF # n succeeds in LBT for transmitting PUSCH, the UE can perform not only PUSCH transmission but also PUCCH transmission.

However, if the UE succeeds in LBT for transmitting PUCCH only, the UE can be allowed to transmit PUCCH only (in consideration of access fairness between channels). In other word, if the UE succeeds in LBT for transmitting PUCCH only, the UE can perform PUCCH transmission only.

3.2.5.2. Method 2

As an LBT method for transmitting PUCCH in an SF # n and transmitting PUSCH in an SF # n+1, a UE can perform LBT using a method described in the following.

For example, in order to transmit PUCCH in the SF # n, the UE performs LBT more advantageous compared to LBT for PUSCH (in this case, LBT related information can be determined in advance or can be configured via higher layer signaling). In order to transmit PUSCH in the SF # n+1, the UE can perform LBT using UL grant information. In particular, in order to transmit PUCCH in the SF # n and transmit PUSCH in the SF # n+1, the UE can perform independent LBT.

As a different example, an eNB informs a UE of LBT related information via a DL grant which is transmitted to transmit PUCCH in an SF # n. If the UE succeeds in performing LBT based on the received LBT related information, the UE can consecutively transmit PUCCH and PUSCH in the SF # n and the SF # n+1.

As a further different example, similar to a combination of the first example and the second example, if there is no separate indication from an eNB via a DL grant, a UE performs fast LBT configured as a default LBT to transmit PUCCH and may be able to additionally perform LBT for transmitting PUSCH. Or, when the UE receives separate indication or specific LBT information from the eNB via a DL grant, if the UE succeeds in performing specific LBT, the UE can perform PUCCH transmission and PUSCH transmission. In other word, when the UE receives specific LBT information from the eNB, if the UE succeeds in performing the specific LBT, the UE may not additionally perform LBT for transmitting PUSCH.

As a further different example, when category 4 LBT related information (configured by common PDCCH or higher layer signaling or configured in advance) is included in a UL grant that schedules transmission in an SF # n+1, if a UE succeeds in performing LBT prior to an SF # n, the UE can perform not only PUCCH transmission in the SF # n but also PUSCH transmission in the SF # n+1.

As a further different example, similar to a combination of the first example and the third example, a UE performs not only the fast LBT but also the category 4 LBT for SF # n transmission and may be able to differentiate a transmission method according to succeeded LBT. In particular, if the UE succeeds in performing the fast LBT, the UE transmits PUCCH in an SF # n and determines whether to transmit a signal in an SF # n+1 by perform LBT again. If the UE succeeds in performing the category 4 LBT, the UE can consecutively transmit a signal in the SF # n and the SF # n+1.

If lengths of PUCCH and PUSCH actually transmitted by the UE vary according to the aforementioned examples, due to the misalignment between the eNB and the UE, it may be difficult for the eNB to perform successful reception. For example, in case of the first example, PUSCH can be configured by 13 symbols in the SF # n+1. In case of the third example, PUSCH can be configured by 14 symbols in the SF # n+1. In particular, in order to prevent the misalignment between the eNB and the UE, when the UE continuously transmits signals in the SF # n and the SF # n+1, a symbol configured as a CCA (Clear Channel Assessment) gap (the last symbol of the SF # n or the first symbol of the SF # n+1) between the SF # n and the SF # n+1 can be transmitted in a manner of being filled with a predetermined signal (e.g., DMRS or SRS (Sounding Reference Signal)) or a reservation signal.

3.2.5.3 Method 3

If a UE is allowed to perform LBT during a short period of time (e.g., 25 us) within channel occupancy time (COT) secured by an eNB (i.e., If a channel is idle during 25 us, the UE starts transmission. If the channel is busy, the UE drops transmission), PUCCH transmission is also allowed within the COT secured by the eNB. In other word, if an LBT method is signaled to the UE, the UE can be allowed to transmit PUCCH (or UL transmission in which UCI information is included) for a short period of time in a subframe to which the LBT is signaled only. In particular, the UE can transmit PUCCH (or a UL signal including UCI information) during an allowed time duration only.

Or, information indicating whether or not a specific subframe (or a time duration of a prescribed length) is located at the inside of COT secured by an eNB (or whether or not the specific subframe is included in the COT) is signaled to a UE, the UE can be allowed to transmit PUCCH (or UL transmission in which UCI information is included) in a subframe (or a time duration of a prescribed length) to which corresponding signaling is indicated.

3.2.5.4 Method 4

For coexistence with Wi-Fi coexisting on an unlicensed band, PUCCH transmission can be allowed only on a carrier on which Wi-Fi does not exist based on long term basis (e.g., by level of regulation). Or, PUCCH transmission can be allowed only on a carrier which is used as a secondary carrier (a carrier to which LBT using random backoff is not applied) in Wi-Fi.

3.2.5.5. Method 5

When a UE continuously transmits PUCCH in consecutive subframes, if the UE individually applies fast LBT to each of the subframes, it is not preferable in terms of PUCCH transmission opportunity. However, although the UE transmits PUCCH during consecutive subframes by performing the fast LBT one time only, it is not preferable as well in the aspect of the coexistence with a different system of an unlicensed band.

Hence, when an LBT method capable of continuously transmitting a signal in the N number of consecutive subframes is defined, the present invention proposes a method that the UE performs the LBT and continuously transmits PUCCH during the N number of subframes.

As a variation, a UE according to the present invention performs LBT capable of continuously transmitting a signal in the N number of consecutive subframes, LBT capable of continuously transmitting a signal in the N−1 number of consecutive subframes, . . . , fast LBT at the same time. The UE applies a case capable of continuously transmitting a signal during the largest subframe sections among the successfully performed LBT methods to perform PUCCH transmission during a corresponding time period.

For example, when there are an LBT parameter set #1 (configured by a CWS, a defer period, and the like) for performing continuous transmission during a period of two subframes and an LBT parameter set #2 for performing continuous transmission during a period of three subframes, if a UE has PUCCH to be continuously transmitted during three consecutive subframes, the UE simultaneously performs the fast LBT, LBT utilizing the LBT parameter set #1, and LBT utilizing the LBT parameter set #2. If the UE succeeds in performing the LBT utilizing the LBT parameter set #1, the UE continuously transmits PUCCH during a period of two subframes and can perform the fast LBT for PUCCH in the remaining one subframe.

3.2.5.6. Method 6

Unlike a licensed band, an unlicensed band has a considerable amount of spectrum resources. In particular, 5 GHz band can be mainly divided into four bands each of which is configured by 5150-5350, 5470-5725, 5725-5850, and 5850-5925 MHz. In this case, if a UE additionally configures an RF operating in a unit of 20 MHz in the aspect of UE implementation, it may cost a lot of money. Hence, it is economically preferable to design an RF to be shared according to a band or the whole of 5 GHz band. In this case, it is impossible for CCs belonging to a specific band using a common RF to transmit and receive a signal at the same time in the aspect of UE implementation.

Figure 22:
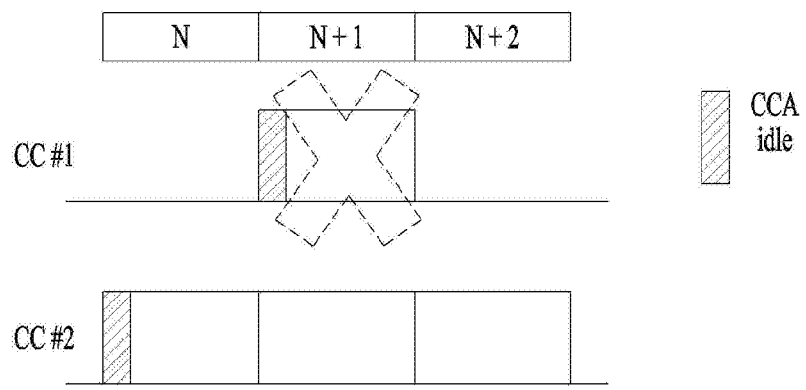
FIGS. 22 and 23 are diagrams briefly illustrating a UE LBT operation applicable to the present invention.
Figure 23:
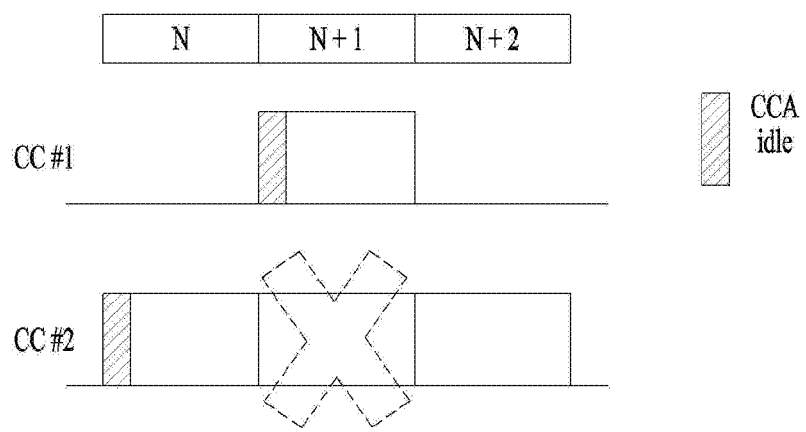

FIGS. 22 and 23 are diagrams briefly illustrating a UE LBT operation applicable to the present invention. In this case, when LAA Scell CC #1 and LAA Scell CC #2 are aggregated, assume that the CC #1 corresponds to a cell in which PUCCH is transmitted. And, assume that the UE uses the same RF to transmit the CC #1 and the CC #2. In particular, when the UE transmits a signal on the CC #2 from an SF # N, although UCI to be transmitted on PUCCH via the CC #1 exists (or occurs) in an SF # N+1, the UE is unable to perform LBT before a signal is transmitted in the SF # N+1.

In order to solve the problem above, the present invention proposes an LBT operation shown in FIGS. 22 and 23. Specifically, although simultaneous transmission of PUCCH and PUSCH is set to a UE (in addition, although the UE is able to simultaneously transmit PUCCH and PUSCH), as shown in FIG. 22, the UE drops PUCCH transmission via the CC #1 in the SF # N+1 and can be configured to transmit UCI by piggybacking the UCI on PUSCH which is transmitted via the CC #2 in the SF # N+1. As a different method, as shown in FIG. 23, the UE drops transmission via the CC #2 in the SF # N+1 and can be configured to perform LBT to perform PUCCH transmission via the CC #1 in the SF # N+1.

As a further different method, a UE according to the present invention changes transmission timing of PUCCH, which is configure to be transmitted via the CC #1, with the SF # N. If LBT is successfully performed on the CC #1 and the CC #2, the UE can transmit PUCCH via the CC #1 and transmit PUSCH via the CC #2 in the SF # N.

As a further different method, a UE according to the present invention drops transmission of PUSCH, which is scheduled to be transmitted via the CC #2 in the SF # N. If LBT is successfully performed on the CC #1 and the CC #2, the UE can transmit PUCCH via the CC #1 and transmit PUSCH via the CC #2 in the SF # N+1.

As mentioned in the foregoing description, a UE according to the present invention performs LBT for transmitting PUCCH and can perform PUCCH transmission according to whether or not the LBT is succeeded. In this case, a success probability of the LBT for transmitting PUCCH (hereinafter, first LBT) may be higher than a success probability of LBT for transmitting PUSCH (hereinafter, second LBT).

For example, if PUCCH transmission and PUSCH transmission are scheduled at the same time in a specific subframe, the UE can perform both the first LBT and the second LBT. Subsequently, if the UE succeeds in performing the second LBT, the UE simultaneously transmits the PUCCH and the PUSCH in the specific subframe. If the UE succeeds in performing the first LBT only, the UE can transmit the PUCCH only in the specific subframe.

As a different example, if PUCCH transmission is scheduled in an $N^{th}$ (N is a natural number) subframe and PUSCH transmission is scheduled in an $(N+1)^{th}$ subframe, the UE can separately perform the second LBT to transmit PUSCH irrespective of whether or not the first LBT is successfully performed. In particular, although the UE successfully performs the first LBT and transmits PUCCH in the $N^{th}$ subframe, the UE can additionally perform the second LBT to transmit PUSCH in the $(N+1)^{th}$ subframe.

As a further different example, when PUCCH transmission is scheduled in an $N^{th}$ (N is a natural number) subframe and PUSCH transmission is scheduled in an $(N+1)^{th}$ subframe, unlike the previous example, if the UE successfully performs the first LBT (without performing the second LBT), the UE may transmit the PUSCH in the $(N+1)^{th}$ subframe.

As a further different example, if PUCCH transmission is scheduled in an $N^{th}$ (N is a natural number) subframe and PUSCH transmission is scheduled in an $(N+1)^{th}$ subframe, the UE can receive information on the first LBT and the third LBT from a base station to transmit PUCCH. In this case, the UE can perform the third LBT to transmit PUCCH. In this case, it may be able to apply random backoff-based LBT (e.g., category 4 LBT) as the third LBT. The information on the third LBT can be transmitted via a DL grant.

Subsequently, if the UE successfully performs the third LBT, the UE can transmit the PUSCH in the $(N+1)^{th}$ subframe. If the UE fails to perform the third LBT, the UE additionally performs the second LBT for transmitting the PUSCH and can determine whether to transmit the PUSCH. In other word, if the UE successfully performs the third LBT, the UE is able to perform PUSCH transmission without performing the second LBT. However, if the UE fails to successfully perform the third LBT, the UE can perform PUSCH transmission only when the second LBT is successfully performed.

As a further different example, if uplink transmission is scheduled to the UE in a time band at which PUCCH is to be transmitted on a second unlicensed band rather than a first unlicensed band on which the PUCCH is to be transmitted, the UE may drop the uplink transmission on the second unlicensed band. By doing so, the UE is able to more reliably transmit PUCCH.

The first LBT corresponds to LBT having a success probability higher than a success probability of the second LBT. As the first LBT, it is able to apply LBT satisfying at least one selected from the group consisting of LBT performing channel sensing during a time period shorter than a time period of the second LBT, LBT to which a contention window (CW) value smaller than a CW value of the second LBT is set, and LBT to which an energy detection threshold value greater than an energy detection threshold value of the second LBT is set.

And, a resource region in which the PUCCH is transmitted may correspond to the whole of an interlace or a part of the interlace configured by frequency resources of which a plurality of frequency bands having a prescribed frequency size are separated from each other with a prescribed interval.

And, a PUCCH resource index at which the PUCCH is transmitted can be determined by a combination of higher layer signaling and downlink control information.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB informs a UE of information on whether to apply the proposed methods (or, information on rules of the proposed methods) via a predefined signal (e.g., physical layer signal or higher layer signal).

4. Device Configuration

Figure 24:
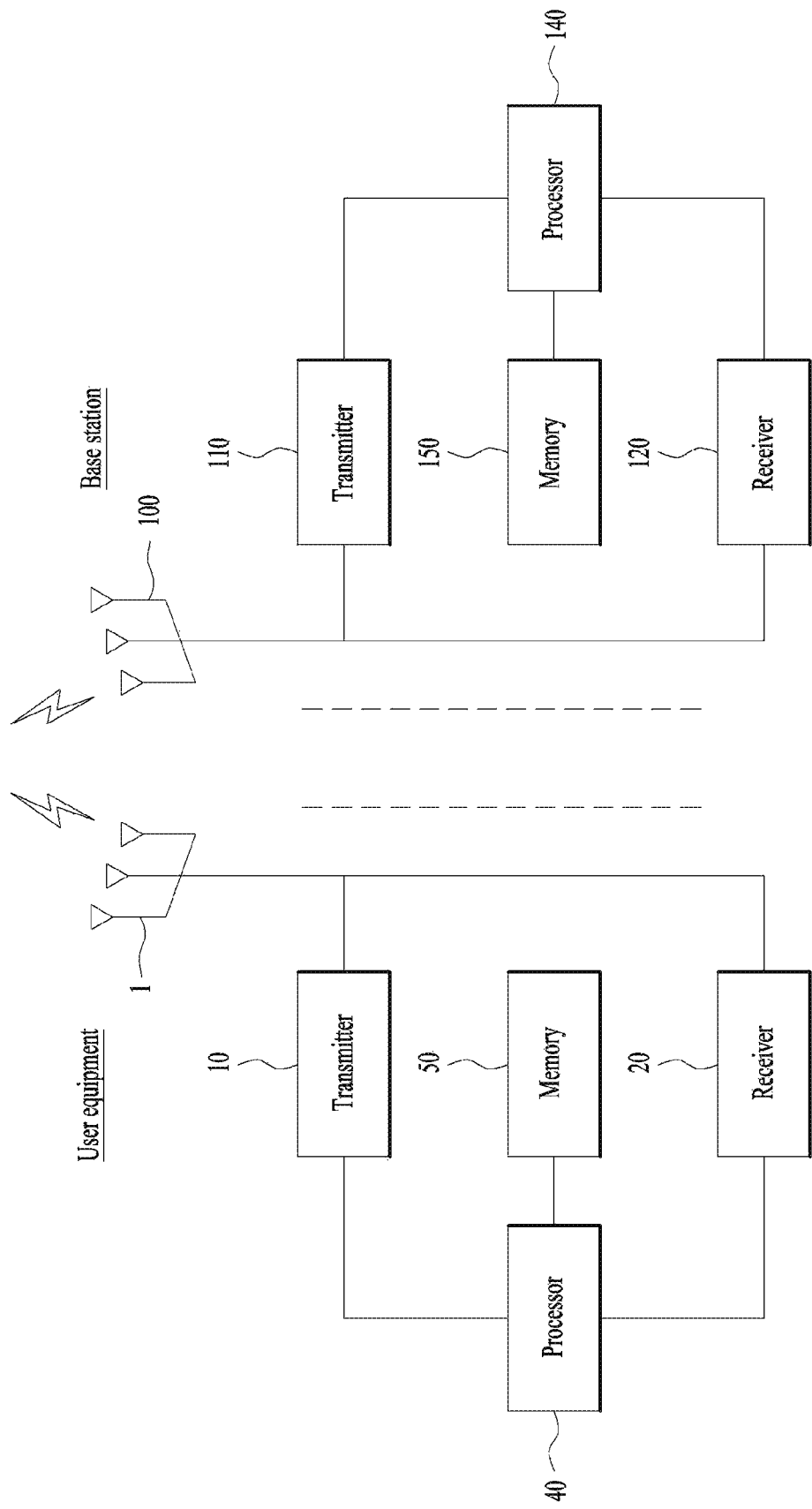
FIG. 24 is a diagram illustrating configurations of a UE and a base station in which proposed embodiments are implementable.

FIG. 24 is a diagram illustrating configurations of a UE and a base station capable of being implemented by the embodiments proposed in the present invention. The UE and the base station shown in FIG. 24 operate to implement the embodiments of a method of transmitting and receiving a physical uplink control channel between the UE and the base station.

A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE performs first LBT for transmitting PUCCH via the processor 4. If the UE successfully performs the first LBT, the UE can be configured to transmit the PUCCH. In this case, a success probability of the first LBT may be higher than a success probability of the second LBT for transmitting a physical uplink shared channel (PUSCH).

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 24 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MB S) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 180 or 190 and executed by the processor 120 or 130. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present invention can be applied to various wireless access systems including 3GPP (3rd Generation Partnership Project) and 3GPP2 system. The embodiments of the present invention can be applied not only to various wireless access systems but also to all technical fields to which the various wireless access systems are applied. Further, the proposed method can also be applied to an mmWave communication system using ultra-high frequency band.

What is claimed is:

1. A method of transmitting a physical uplink control channel (PUCCH), by a user equipment in a wireless communication system supporting an unlicensed band, the method comprising:
    performing first LBT (Listen-Before-Talk) for transmitting the PUCCH; and
    when the first LBT is successfully performed, transmitting the PUCCH,
    wherein a probability of success of the first LBT is higher than a probability of success of a second LBT for transmitting a physical uplink shared channel (PUSCH), and
    wherein the first LBT corresponds to LBT satisfying at least one selected from the group consisting of LBT performing channel sensing during a time period shorter than a time period of the second LBT, LBT to which a contention window (CW) size value smaller than a CW size value of the second LBT is set, and LBT to which an energy detection threshold value greater than an energy detection threshold value of the second LBT is set.

2. The method of claim 1, further comprising:
when the first LBT and the second LBT are performed to transmit the PUCCH and a separate PUSCH at a same time in a specific subframe:
when the second LBT is successfully performed, transmitting the PUCCH and the PUSCH at the same time in the specific subframe; and
when the first LBT is successfully performed only, transmitting the PUCCH only in the specific subframe.

3. The method of claim 1, further comprising:
when transmission of the PUCCH is scheduled in an Nth (N is a natural number) subframe and transmission of the PUSCH is scheduled in an (N+1)th subframe, performing the second LBT for transmitting the PUSCH irrespective of the first LBT.

4. The method of claim 1, further comprising:
when transmission of the PUCCH is scheduled in an Nth (N is a natural number) subframe and transmission of the PUSCH is scheduled in an (N+1)th subframe, when the first LBT is successfully performed, transmitting the PUSCH in the (N+1)th subframe.

5. The method of claim 1, further comprising:
when transmission of the PUCCH is scheduled in an Nth (N is a natural number) subframe, transmission of the PUSCH is scheduled in an (N+1)th subframe, and information on third LBT is received from a base station:
additionally performing the third LBT to transmit the PUCCH; and
when the third LBT is successfully performed, transmitting the PUSCH in the (N+1)th subframe, and when the third LBT fails, determining whether to transmit the PUSCH by performing the second LBT for transmitting the PUSCH,
wherein the third LBT corresponds to random backoff-based LBT.

6. The method of claim 1, further comprising:
when uplink transmission is scheduled in a time band at which the PUCCH is to be transmitted on a second unlicensed band rather than a first unlicensed band on which the PUCCH is to be transmitted, dropping the uplink transmission on the second unlicensed band.

7. The method of claim 1, wherein a resource region in which the PUCCH is transmitted corresponds to the whole of an interlace or a part of the interlace configured by frequency resources of which a plurality of frequency bands having a prescribed frequency size are separated from each other with a prescribed interval.

8. The method of claim 1, wherein a PUCCH resource index at which the PUCCH is transmitted is determined by a combination of higher layer signaling and downlink control information.

9. A user equipment for transmitting a physical uplink control channel (PUCCH) to a base station in a wireless communication system supporting an unlicensed band, the user equipment comprising:
a transmitter; and
a processor configured to operate in a manner of being connected with the transmitter transmitter,
wherein the processor is further configured to:
perform first LBT (Listen-Before-Talk) for transmitting the PUCCH; and
when the first LBT is successfully performed, transmit the PUCCH,
wherein a probability of success of the first LBT is higher than a probability of success of a second LBT for transmitting a physical uplink shared channel (PUSCH), and
wherein the first LBT corresponds to LBT satisfying at least one selected from the group consisting of LBT performing channel sensing during a time period shorter than a time period of the second LBT, LBT to which a contention window (CW) size value smaller than a CW size value of the second LBT is set, and LBT to which an energy detection threshold value greater than an energy detection threshold value of the second LBT is set.

10. The user equipment of claim 9, wherein when the user equipment performs the first LBT and the second LBT to transmit the PUCCH and a separate PUSCH at a same time in a specific subframe, the processor, when the second LBT is successfully performed, is further configured to transmit the PUCCH and the PUSCH at the same time in the specific subframe and the processor, when the first LBT is successfully performed only, is further configured to transmit the PUCCH only in the specific subframe.

11. The user equipment of claim 9, wherein when transmission of the PUCCH is scheduled to the user equipment in an Nth (N is a natural number) subframe and transmission of the PUSCH is scheduled to the user equipment in an (N+1)th subframe, the processor is further configured to perform the second LBT for transmitting the PUSCH irrespective of the first LBT.

12. The user equipment of claim 9, wherein when transmission of the PUCCH is scheduled to the user equipment in an Nth (N is a natural number) subframe and transmission of the PUSCH is scheduled to the user equipment in an (N+1)th subframe, the processor, when the first LBT is successfully performed, is further configured to transmit the PUSCH in the (N+1)th subframe.

13. The user equipment of claim 9, wherein when transmission of the PUCCH is scheduled to the user equipment in an Nth (N is a natural number) subframe, transmission of the PUSCH is scheduled to the user equipment in an (N+1)th subframe, and information on third LBT is received from the base station, the processor is further configured to additionally perform the third LBT to transmit the PUCCH, the processor, when the third LBT is successfully performed, is further configured to transmit the PUSCH in the (N+1)th subframe, and the processor, when the third LBT fails, is further configured to determine whether to transmit the PUSCH by performing the second LBT for transmitting the PUSCH, and
wherein the third LBT corresponds to random backoff-based LBT.

14. The user equipment of claim 9, wherein when uplink transmission is scheduled to the user equipment in a time band at which the PUCCH is to be transmitted on a second unlicensed band rather than a first unlicensed band on which the PUCCH is to be transmitted, the processor is further configured to drop the uplink transmission on the second unlicensed band.

15. The user equipment of claim 9, wherein a resource region in which the PUCCH is transmitted corresponds to the whole of an interlace or a part of the interlace configured by frequency resources of which a plurality of frequency bands having a prescribed frequency size are separated from each other with a prescribed interval.

16. The user equipment of claim 9, wherein a PUCCH resource index at which the PUCCH is transmitted is determined by a combination of higher layer signaling and downlink control information.

* * * * *